United States Patent
Barac et al.

(10) Patent No.: US 12,520,188 B2
(45) Date of Patent: Jan. 6, 2026

(54) MAPPING INFORMATION FOR INTEGRATED ACCESS AND BACKHAUL

(71) Applicant: Telefonaktiebolaget LM Ericsson (publ), Stockholm (SE)

(72) Inventors: Filip Barac, Huddinge (SE); Julien Muller, Rennes (FR); Oumer Teyeb, Montréal (CA); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 608 days.

(21) Appl. No.: 17/625,259

(22) PCT Filed: May 29, 2020

(86) PCT No.: PCT/SE2020/050543
§ 371 (c)(1),
(2) Date: Jan. 6, 2022

(87) PCT Pub. No.: WO2021/006783
PCT Pub. Date: Jan. 14, 2021

(65) Prior Publication Data
US 2022/0377595 A1    Nov. 24, 2022

Related U.S. Application Data

(60) Provisional application No. 62/871,902, filed on Jul. 9, 2019.

(51) Int. Cl.
*H04W 28/02* (2009.01)
*H04W 88/08* (2009.01)

(52) U.S. Cl.
CPC ... *H04W 28/0263* (2013.01); *H04W 28/0236* (2013.01); *H04W 88/08* (2013.01)

(58) Field of Classification Search
CPC ......... H04W 28/0263; H04W 28/0236; H04W 88/08
See application file for complete search history.

(56) References Cited

U.S. PATENT DOCUMENTS

| | | |
|---|---|---|
| 9,160,566 B2 | 10/2015 | Ulupinar et al. |
| 10,334,485 B2 | 6/2019 | Chandramouli et al. |

(Continued)

FOREIGN PATENT DOCUMENTS

| | | |
|---|---|---|
| CN | 102388578 A | 3/2012 |
| CN | 105144777 A | 12/2015 |

(Continued)

OTHER PUBLICATIONS

3GPP TSG-RAN WG3 Meeting #104, R3-192803 Reno, Nevada, USA, May 13-17, 2019 Source: Huawei Title: Integration of IAB Node (Year: 2019).*

(Continued)

*Primary Examiner* — Sujoy K Kundu
*Assistant Examiner* — Weibin Huang
(74) *Attorney, Agent, or Firm* — Murphy, Bilak & Homiller, PLLC

(57) ABSTRACT

Mapping Information for Integrated Access and Backhaul-Embodiments described herein relate to methods and apparatus for providing IAB mapping information. A method performed by CU-CP of a base station configured as a donor base station for one or more IAB nodes comprises transmitting a first message to setup or modify a first bearer context for a first bearer in a central unit user plane, CU-UP, of the base station, wherein the first message comprises an information element indicating mapping information for use in determining a mapping of the first bearer to a backhaul radio link control, BH RLC, channel.

24 Claims, 23 Drawing Sheets

(56) References Cited

U.S. PATENT DOCUMENTS

| | | | |
|---|---|---|---|
| 11,140,585 B2 | 10/2021 | Xu et al. | |
| 11,496,923 B2* | 11/2022 | Zhu | H04W 72/1263 |
| 11,665,575 B2* | 5/2023 | Liu | H04W 76/12 370/229 |
| 2020/0229023 A1* | 7/2020 | Ke | H04W 28/0268 |
| 2020/0267795 A1* | 8/2020 | Jung | H04W 36/16 |
| 2020/0413457 A1* | 12/2020 | Hong | H04W 76/10 |
| 2021/0014722 A1* | 1/2021 | Han | H04W 28/0268 |
| 2021/0168646 A1* | 6/2021 | Chen | H04W 28/10 |
| 2021/0243672 A1* | 8/2021 | Deshmukh | H04W 40/24 |

FOREIGN PATENT DOCUMENTS

| | | | |
|---|---|---|---|
| CN | 106465080 | A | 2/2017 |
| CN | 108605254 | A | 9/2018 |
| WO | 2015139729 | A1 | 9/2015 |
| WO | 2015143607 | A1 | 10/2015 |
| WO | 2018009340 | A1 | 1/2018 |

OTHER PUBLICATIONS

3GPP TSG SA WG3 (Security) Meeting #95 S3-191516 Reno (US), May 6-10, 2019 Source: Qualcomm Incorporated Title: Status on RAN WI NR_IAB (Year: 2019).*

3GPP, "3rd Generation Partnership Project; Technical Specification Group Radio Access Network; NG-RAN; E1 Application Protocol (E1AP) (Release 15)", 3GPP TS 38.463 V15.3.0, Mar. 2019, 1-165.

3GPP, "3rd Generation Partnership Project; Technical Specification Group Radio Access Network; NR; Study on Integrated Access and Backhaul; (Release 16)", 3GPP TR 38.874 V16.0.0, Dec. 2018, 1-111.

Unknown, Author, "Discussion on user plane bearer mapping and comparision", 3GPP TSG-RAN WG2#103bis, R2-1814723, Chengdu, China, Oct. 8-12, 2018, 1-6.

Unknown, Author, "IAB bearer mapping decision and configuration", 3GPP TSG-RAN WG2#106, R2-1906069, Revision of R2-1905103, Reno, US, May 13-17, 2019, 1-4.

Unknown, Author, "Integration of IAB Node", 3GPP TSG-RAN WG3 Meeting #104, R3-192803, Reno, Nevada, USA, May 13-17, 2019, 1-7.

Unknown, Author, "IP routing between IAB and operator network", 3GPP TSG-RAN WG2 Meeting #105, R2-1903582, Xi'an, China, Apr. 8-12, 1-5.

Unknown, Author, "QoS Mapping to Backhaul Bearers in IAB Networks", 3GPP TSG RAN WG3 Meeting #103bis, R3-191358, Xi'an, P.R. China, Apr. 8-12, 2019, 1-3.

Unknown, Author, "Status on RAN WI NR_IAB", 3GPP TSG SA WG3 (Security) Meeting #95, S3-191516, Reno (US), May 6-10, 2019, 1-11.

* cited by examiner

6A1

Transmit a first message to setup or modify a first bearer context for a first bearer in a central unit user plane, CU-UP, of the base station, wherein the first message comprises an information element indicating mapping information for use in determining a mapping of the first bearer to a backhaul radio link control, BH RLC, channel

FIG. 6A

MAPPING INFORMATION FOR INTEGRATED ACCESS AND BACKHAUL

TECHNICAL FIELD

Embodiments of the present disclosure relate to methods and apparatus in networks, and particularly base stations, communication systems and methods in base stations and communication systems for providing mapping information.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Integrated Access and Backhaul

Densification via the deployment of more and more base stations (whether macro or micro base stations) is one of the mechanisms that may be employed to satisfy an ever-increasing demand for more and more bandwidth and/or capacity in mobile networks. Due to the availability of more spectrum in the millimeter wave (mmw) band, deploying small cells that operate in this band may be an attractive deployment option for these purposes. However, deploying fiber to the small cells, which is the usual way in which small cells are deployed, can end up being very expensive and impractical. Thus, employing a wireless link for connecting the small cells to the operator's network may be a cheaper and more practical alternative. One such solution is an Integrated Access and Backhaul (IAB) network, where the operator may utilize part of the radio resources for the backhaul link.

Integrated access and backhaul (IAB) has been studied earlier in the 3rd Generation Partnership Project (3GPP) in the scope of Long Term Evolution (LTE) Rel-10. In that work, an architecture was adopted where a Relay Node (RN) has the functionality of an LTE eNB and User Equipment (UE) modem. The RN is connected to a donor eNB which has a S1/X2 proxy functionality hiding the RN from the rest of the network. That architecture enabled the donor eNB to be aware of the UEs behind the RN, and enabled the donor eNB to hide any UE mobility between donor eNB and a RN on the same donor eNB from the Core Network (CN).

During Rel-10 other architectures were also considered, for example, architectures in which the RNs are more transparent to the donor gNB and may be allocated a separate stand-alone P/S-GW node.

For New Radio (NR), similar architecture options may also be considered. One potential difference compared to LTE (besides lower layer differences) is that a gNB-CU/DU (Centralized Unit/Distributed Unit) split is defined for NR, which allows a separation of time critical RLC/MAC/PHY protocols from less time critical RRC/PDCP protocols. Such a split may also be applied for the IAB case. Other differences anticipated in NR, as compared to LTE with regards to IAB, are the support of multiple hops as well as the support of redundant paths.

In A FIG. 1A, an IAB deployment is illustrated where the IAB donor node (in short IAB donor) has a wired connection to the core network, and the IAB relay nodes (in short IAB nodes) are wirelessly connected using NR to the IAB donor, either directly or indirectly via another IAB node. The connection between IAB donor/node and UEs is called access link, whereas the connection between two IAB nodes or between an IAB donor and an IAB node is called backhaul link.

Furthermore, as illustrated in FIG. 1B, the adjacent upstream IAB node of an IAB node (which is closer to the IAB donor node) is referred to as a parent node of the IAB node. The adjacent downstream node of an IAB node (which is further away from the IAB donor node) is referred to as a child node of the IAB node. The backhaul link between the parent node and the IAB node is referred to as a parent (backhaul) link, whereas the backhaul link between the IAB node and the child node is referred to as a child (backhaul) link.

Integrated Access Backhaul Architectures

As discussed in the technical report TR 38.874 v 16.0.0 [1], it has been agreed to adopt a solution that leverages the Central Unit (CU)/Distributed Unit (DU) split architecture of NR, where the IAB node will be hosting a DU part that is controlled by a central unit (CU). The IAB nodes may also have a Mobile Termination (MT) part that they use to communicate with their parent nodes.

The specifications for IAB strive to reuse existing functions and interfaces defined in NR. In particular, Mobile Termination (MT), gNB Distributed Unit (gNB-DU), gNB Central Unit (gNB-CU), User Plane Function (UPF), Access and Mobility Management Function (AMF) and the Session Management Function (SMF) as well as the corresponding interfaces NR Uu (between MT and gNB), F1 (between gNB-DU and gNB-CU), NG, X2 and N4 are used as baseline for the IAB architectures. Modifications or enhancements to these functions and interfaces for the support of IAB will be explained in the context of the architecture discussion. Additional functionality such as multi-hop forwarding may be included in the architecture discussion as an aid to the understanding of IAB operation; certain aspects may also require standardization.

The Mobile-Termination (MT) function has been defined as a component of the IAB node. MT is referred to herein as a function residing on an IAB-node that terminates the radio interface layers of the backhaul Uu interface toward the IAB-donor or other IAB-nodes.

FIG. 2A, which is taken from TR 38.874 [1], illustrates a reference diagram for IAB in standalone mode, in this example, the system comprises one IAB-donor and multiple IAB-nodes. The IAB-donor in this example is treated as a single logical node that comprises a set of functions such as gNB-DU, gNB-CU-Control Plane (CP), gNB-CU-User Plane (UP) and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

The baseline User Plane and Control Plane protocol stacks for IAB are illustrated in FIGS. 2B and 2C.

As shown in FIG. 2, the chosen protocol stacks reuse the current CU-DU split specification in Rel-15, where the full user plane F1-U (GTP-U/UDP/IP) is terminated at the IAB node (like for a normal DU) and the full control plane F1-C (F1-AP/SCTP/IP) is also terminated at the IAB node (like for a normal DU). In the examples illustrated by FIG. 2, Network Domain Security (NDS) has been employed to protect both UP and CP traffic (IPsec in the case of UP, and Datagram Transport Layer Security (DTLS) in the case of CP). IPsec could also be used for the CP protection instead of DTLS (in this case no DTLS layer would be used).

A new protocol layer called Backhaul Adaptation Protocol (BAP) has been introduced in the IAB nodes and the IAB donor. The BAP is used for routing of packets to the appropriate downstream/upstream node, and also for mapping the UE bearer data to the proper backhaul RLC channel (and also between ingress and egress backhaul RLC channels in intermediate IAB nodes) to satisfy the end to end QoS requirements of bearers.

At the 3GPP RAN2 #105 meeting, the modelling of the Adaptation (i.e. BAP) layer was discussed and the following was agreed:

---

Agreements:

---

• RAN2 confirms that routing and bearer mapping (e.g. mapping of BH RLC channels) are adaptation layer functions
• R2 assumes that TX part of adaptation layer performs routing and "bearer mapping", RX part of adaptation layer performs "bearer demapping"
• R2 assumes that SDUs are forwarded from RX part of adaptation layer to TX part of adaptation layer (for the next hop) for packets that are relayed by the IAB node.
• FFS how we model w.r.t protocol entities, e.g. whether separate for DU and MT or not, and FFS how these are configured, F1-AP or RRC.

---

It may be preferable to include a BAP entity in both MT and DU parts of the IAB-node protocol stack. Modelling the BAP layer this way facilitates the realization of the routing and mapping functionalities of the BAP layer.

Before discussing the operations of the two BAP entities, it may be considered as to whether the radio bearers carrying CP/UP traffic for the MT functionality of an IAB node should be handled separately from the BH RLC channels. Note that the BH RLC channels are used to carry traffic to/from the IAB DU functionality, which could be either be intended for the UEs served by the IAB node or for serving the child IAB nodes. It may be preferable to handle the radio bearers carrying CP/UP traffic for the MT functionality of an IAB node separately from the BH RLC channels, by employing different logical channel IDs.

FIGS. 3A and 3B illustrate the flow of packets in the DL direction, while FIGS. 4A and 4B illustrate the flow of packets in the UL direction.

In the configurations shown in FIGS. 3A and 3B, when a packet arrives at the IAB donor DU (from the donor CU), it is processed first by the upper layers (as there is no MT BAP layer at the donor DU).

If the packet is destined for a UE directly connected to the IAB donor DU, or it is F1-AP traffic destined at the IAB donor DU, it is forwarded to higher layers (IP/UDP/GTP-U for UP, IP/SCTP/F1-AP for CP).

Otherwise (e.g. the packet is to be forwarded further downstream), it is forwarded to the DU BAP layer.

When a packet arrives at an IAB node (e.g. at IAB 1 from IAB donor DU or at IAB 2 or 3 from IAB 1) via backhaul RLC channels it may be processed first by the MT BAP layer.

If the packet is destined for a UE directly connected to the IAB node or F1-AP traffic destined at the IAB node's DU, it may be forwarded to higher layers (IP/UDP/GTP-U for UP, IP/SCTP/F1-AP for CP).

Otherwise (e.g. the packet is to be forwarded further downstream), it is forwarded to the DU BAP layer.

In the examples discussed above, the DU BAP may determine which route (i.e. to which child node) the packet should be forwarded to, and which BH RLC channel within that route will be used for forwarding the packet downstream.

In the configurations shown in FIGS. 4A and 4B, when a packet arrives at the IAB donor DU (from a child IAB node) via backhaul RLC channels, it may be processed first by the DU BAP layer and may be forwarded to the donor CU (as the donor DU may be connected to at most one donor CU, there may be no routing functionality required).

When a packet arrives at an IAB node in the UL direction (e.g. at IAB1 from IAB2 or IAB3): If the packet is coming from a child IAB node via backhaul RLC channels it may be processed first by the DU BAP layer and, since every UL packet is destined to be forwarded to the donor CU, the packet is passed on to the MT BAP layer.

If the packet is from a UE connected directly to the IAB node, or the packet is an F1-AP traffic originating from the IAB node, it may be processed first by the higher layers (IP/UDP/GTP-U for UP, IP/SCTP/F1-AP for CP) and may then be forwarded to the MT BAP layer.

The MT BAP may determine which route (i.e. to which parent node) the packet should be forwarded to, and which BH RLC channel within that route will be used for forwarding the packet upstream.

Quality of Service and UE Bearer Mapping to Backhaul RLC Channels

The 3GPP has agreed that the standard should support two options for mapping the UE bearers on backhaul RLC channels: many-to-one (N:1) and one-to-one (1:1) UE bearer mappings, as shown in FIGS. 5A and 5B respectively.

For N:1 mapping UE bearers with similar QoS may be mapped to the same BH RLC channel, while for 1:1 mapping a single UE bearer may be mapped to a dedicated BHRLC channel at every hop on the path towards the UE.

For 1:1 bearer mapping, the IPv6 Flow Label field may be used, where the donor DU is configured to map IP packets that are marked with a given Flow Label to a particular Logical Channel ID (LCID) on the first backhaul link between the donor DU and the first downstream IAB node. For the case of N:1 mapping, the DSCP field in the IP header may be used for the mapping purpose (in order to support also IPv4 networks). However, it is not determined whether to have a unified behaviour where the IPv6 Flow Label can be used for N:1 mapping as well. It may also be considered to use the combination of the flow label and the DSCP field for 1:1 mapping.

There currently exist certain challenge(s)

As discussed above, routing and bearer mapping functionalities may be performed by the BAP layer of the donor DU, the intermediate IAB nodes, and the access IAB nodes in a multi-hop IAB network. When the CU is split into User Plane (UP) and Control Plane (CP) entities via the E1 interface (see TS 38.463), it may be the CU-CP's functionality to determine to which IAB node a UE or another IAB node connects to, which path (in case there are multiple paths towards a given IAB node) should be taken by a given bearer, what kind of bearer mapping is to be used (1:1 or N:1), etc. On the other hand, it may be the CU-UP that will be forwarding the DL data towards the donor DU and receiving UL data from the donor DU.

Currently, it is not specified how the CU-UP becomes aware of the bearer mapping configurations to apply for UE bearers.

[1] TR 38.874 v 16.0.0, available at https://portal.3qpp.org/desktopmodules/Specifications/Specification Details.aspx?specificationld=3232 as of 6 Apr. 2020 describes the architectures, the radio protocols, and the physical layer aspects related to relaying of access traffic by sharing radio resources between access and backhaul links.

[2] TS 38.463 v 15.3.0, available at https://portal.3gpp.omidesktopmodulesiSpecifications/Specification Details.aspx?specificationld=3431 as of 6 Apr. 2020 specifies the 5G radio network layer signalling protocol for the E1 interface. The E1 interface provides means for interconnecting a gNB-CU-CP and a gNB-CU-UP of a gNB within an NG-RAN, or for interconnecting a gNB-CU-CP and a gNB-CU-UP of an en-gNB within an E-UTRAN.

"QoS Mapping to Backhaul Bearers in IAB Networks" by Ericsson, 3GPP draft R3-193153, XP051702637, available at https://www.3gpp.org/ftp/TSG_RAN/WG3_lu/T6GR3_103bis/Docs/ as of 20 Apr. 2021 discusses QoS mapping between Donor-DUs and destination/access IAB nodes.

SUMMARY

It is an object of the present disclosure to provide signalling for mapping information transfer, thereby supporting the use of split architectures.

Embodiments of the disclosure aim to provide apparatus and methods that alleviate some or all of the issues identified.

An aspect of an embodiment of the disclosure provides a method performed by central unit control plane, CU-CP, of a base station for providing Integrated Access and Backhaul, IAB, mapping information, wherein the base station is configured as a donor base station for one or more IAB nodes, the method comprising: transmitting a first message to setup or modify a first bearer context for a first bearer in a central unit user plane, CU-UP, of the base station, wherein the first message comprises an information element indicating mapping information for use in determining a mapping of the first bearer to a backhaul radio link control, BH RLC, channel.

A further aspect of an embodiment of the disclosure provides a performed by central unit user plane, CU-UP, of a base station for providing Integrated Access and Backhaul, IAB, mapping information, wherein the base station is configured as a donor base station for one or more IAB nodes, the method comprising: receiving a first message from a central unit control plane, CU-CP, of the base station to setup or modify a first bearer context for a first bearer in a central unit user plane, CU-UP, of the base station; obtaining mapping information for use in determining a mapping of the first bearer to a backhaul radio link control, BH RLC, channel; and based on the mapping information, determining a field value for the first bearer wherein the field value maps the first bearer to the BH RLC.

A further aspect of an embodiment of the disclosure provides a base station for providing Integrated Access and Backhaul, IAB, mapping information, the base station being configured as a donor base station for one or more IAB nodes, comprising: processing circuitry configured to cause central unit control plane, CU-CP, of the base station to: transmit a first message to setup or modify a first bearer context for a first bearer in a central unit user plane, CU-UP, of the base station, wherein the first message comprises an information element indicating mapping information for use in determining a mapping of the first bearer to a backhaul radio link control, BH RLC, channel; and power supply circuitry configured to supply power to the base station.

A further aspect of an embodiment provides a base station for providing Integrated Access and Backhaul, IAB, mapping information, the base station being configured as a donor base station for one or more IAB nodes, comprising: processing circuitry configured to cause central unit user plane, CU-UP, of the base station to: receive a first message from a central unit control plane, CU-CP, of the base station to setup or modify a first bearer context for a first bearer in a central unit user plane, CU-UP, of the base station; obtain mapping information for use in determining a mapping of the first bearer to a backhaul radio link control, BH RLC, channel; and based on the mapping information, determine a field value for the first bearer wherein the field value maps the first bearer to the BH RLC; and power supply circuitry configured to supply power to the base station.

BRIEF DESCRIPTION OF DRAWINGS

For a better understanding of the present disclosure, and to show how it may be put into effect, reference will now be made, by way of example only, to the accompanying drawings, in which:

FIG. 6A is a flowchart of a method in accordance with some embodiments;

Certain aspects of the present disclosure and their embodiments may provide solutions to these or other challenges. Embodiments described herein propose signaling that enables the IAB donor gNB-CU-UP to assign proper mapping information over the F1-U interface (with the gNB-DU), required for mapping UE DL user plane data to the correct backhaul RLC channel.

There are, proposed herein, various embodiments which address one or more of the issues disclosed herein.

Certain embodiments may provide one or more of the following technical advantage(s): The proposed embodiments may be essential for IAB operation, since they enables the configuration of the CU-UP or the CU-CP that may be essential for assigning the proper DSCP and/or IP Flow Labels to the F1-U packets that are carrying the UE bearers. The DSCP and/or IP Flow Labels (or other field value) may be used for mapping UE bearers of 1:1 or N:1 bearer mapping between UE bearers and to IAB backhaul RLC channels in case of CP/UP split architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments described herein are presented using a non-limiting example of E1 signaling between the gNB-CU-CP and the gNB CU-DU of the donor gNB. For example, the donor gNB-CU-CP may configure the donor gNB-CU-UP with appropriate configuration information for mapping of the UE data radio bearers (DRBs) to backhaul RLC channels.

FIG. 6A depicts a method in accordance with particular embodiments. In particular FIG. 6A illustrates a method performed by a central unit control plane (CU-CP) of a base station (e.g. a gNB) for providing Integrated Access and Backhaul (IAB) mapping information. The base station (e.g. gNB) is configured as a donor base station (e.g. the IAB donor as described above) for one or more IAB nodes. The method begins at step 6A1 with transmitting a first message to setup or modify a first bearer context for a first bearer in a central unit user plane, CU-UP, of the base station, wherein the first message comprises an information element indicating mapping information for use in determining a mapping of the first bearer to a backhaul radio link control, BH RLC, channel.

The first message may comprise an E1 Application Protocol (AP) bearer context setup request, or a bearer context modification request message.

In some examples, the method may further comprise updating the already signaled mapping information for each DRB to be modified at the gNB-CU-UP(s) serving the UE (e.g. by transmitting an E1AP BEARER CONTEXT MODIFICATION REQUEST message comprising the updated mapping information).

Figure 5:
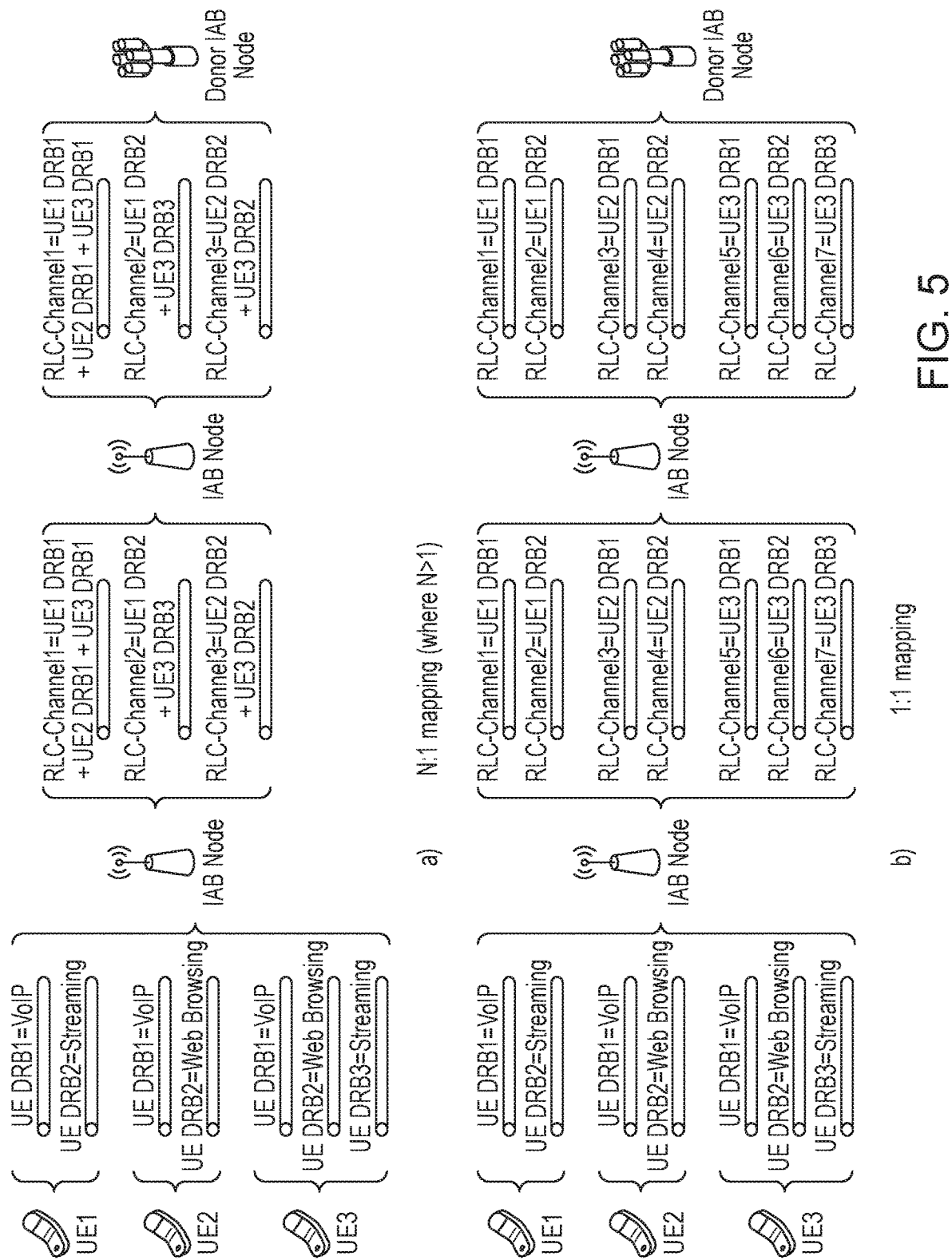
FIG. 5A is an illustration of an example of N:1 bearer mapping between UE bearers and backhaul RLC channels in IAB networks.
FIG. 5B is an illustration of an example of 1:1 bearer mapping between UE bearers and backhaul RLC channels in IAB networks.

In some examples, the mapping information transmitted in step 6A1 may comprise a field value. The field value may map the first bearer to a BH RLC. The mapping may either be one-to-one as illustrated in FIG. 5B) or N-to-one as illustrated in FIG. 5A).

In some examples, the field value comprises a differentiated services code point, DSCP, value. For example, the field value may comprise a DSCP value where N-to-one mapping is used. In some examples the field value comprises a Flow Label value (for example in an IPv6 header). For example, the field value may comprise a Flow Label value where one-to-one mapping is used.

In particular, the CU-CP may assign a field value to each different bearer destined to a particular IP address of the access IAB node (i.e. the last-hop IAB node that provides the access to the UE). At the first backhaul link (or hop), the bearers may then be assigned to the different BH RLCs by associating them with the field value for the BH RLC. The field values may be reused for different IP address, for example, for bearers destined to different access IAB nodes or to the same IAB node over different paths, where each path is assigned a different IP address (i.e. the access IAB node is assigned multiple IP addresses).

Where the CU-CP assigns field values to different bearers, the CU-CP may need to keep track of the field values used in order to maintain the proper mapping (for example, one-to-one or N-to-one mapping). In particular, the CU-CP may be required to ensure that a field value is only assigned to one BH RLC per link between two IAB nodes.

In examples where the CU-CP assigns the field values, the CU-CP may keep track of the field values that are being assigned to bearers being served via a given IAB node to make sure that a flow label is unique per access IAB node. In cases where the IAB node can be accessed via multiple paths and has multiple IP addresses associated with each path, the uniqueness of the field value may be maintained only within one of the IP addresses (i.e. the uniqueness is per a given path to the IAB node).

In some examples, the mapping information transmitted by the CU-CP in step W02 may not comprise the field value itself. For example, the mapping information may comprise an indication of whether the first bearer is to be mapped one-to-one to a BH RLC or not. In this example, the CU-UP may assign a field value to the first bearer as will be described below.

In some examples, the mapping information transmitted by the CU-CP in step W02 may comprise an indication of whether the first bearer is served by an IAB node. Again, in these examples, the CU-UP may assign a field value to the first bearer as will be described below.

It should be noted that in an example in which all the bearers of a UE are served via IAB node(s) (e.g. a UE is not dual connected between an IAB node and a non IAB node) it may not be necessary to communicate whether each bearer is an IAB bearer or not, and instead it may be indicated if the UE is an IAB-served UE or not.

Figure 6B:
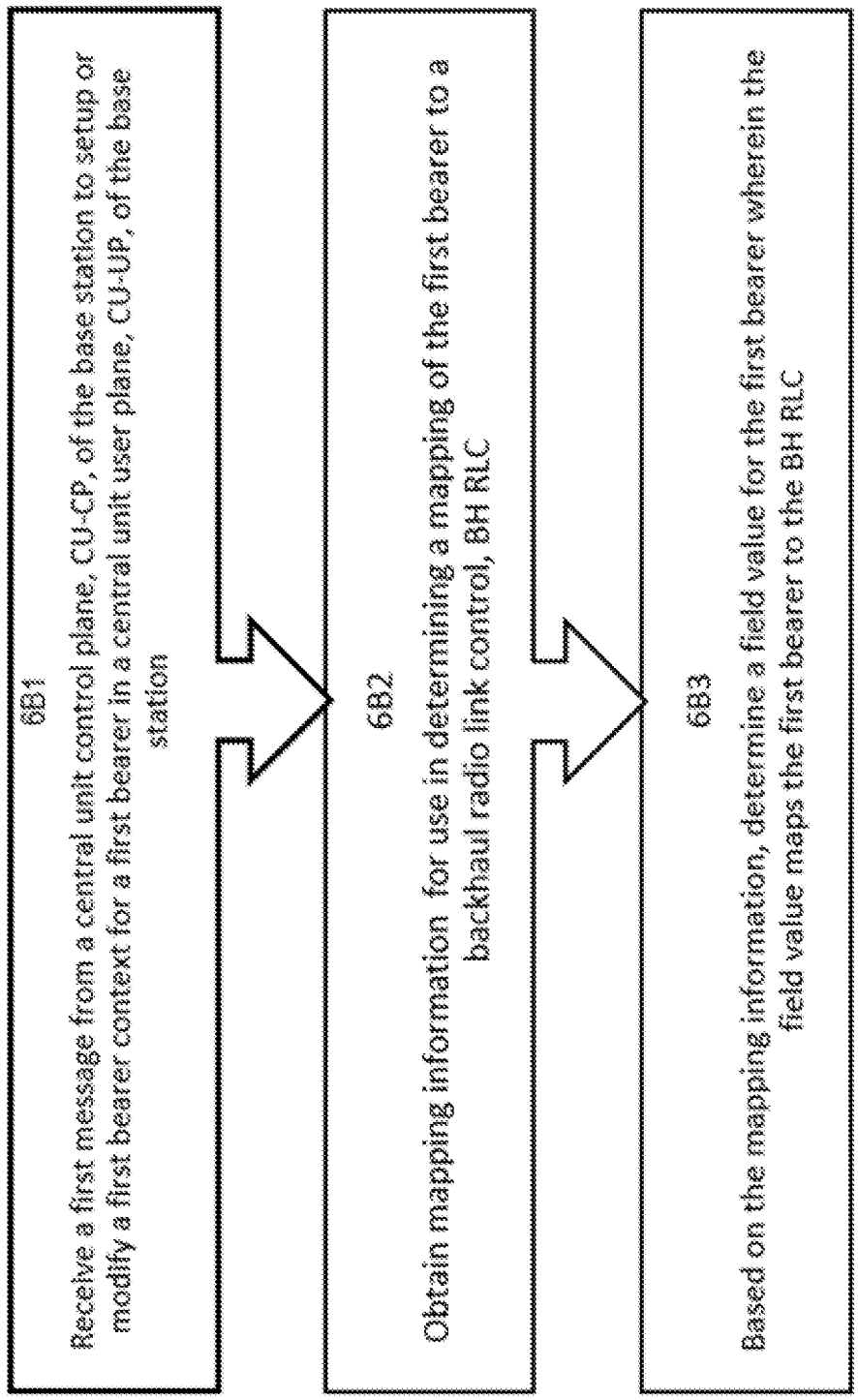
FIG. 6B is a flowchart of a method in accordance with some embodiments.

FIG. 6B depicts a method in accordance with particular embodiments. In particular FIG. 6B illustrates a method performed by central unit user plane, CU-UP, of a base station for providing Integrated Access and Backhaul, IAB, mapping information, wherein the base station is configured as a donor base station (e.g. donor IAB as described above) for one or more IAB nodes. The base station (e.g. gNB) may also comprise the CU-CP configured to perform the method as described above with reference to FIG. 6A.

The method begins at step 6B1 with receiving a first message from the central unit control plane, CU-CP, of the base station to setup or modify a first bearer context for a first bearer in a central unit user plane, CU-UP, of the base station.

In step 6B2 the method comprises obtaining mapping information for use in determining a mapping of the first bearer to a backhaul radio link control, BH RLC, channel.

In step 6B3 the method comprises based on the mapping information, determining a field value for the first bearer wherein the field value maps the first bearer to the BH RLC.

The method may further comprise transmitting the field value to a transport layer for inclusion in a header of user plane packets for the first bearer. The field value may therefore be used to map the first bearer to a BH RLC. The mapping may either be one-to-one as illustrated in FIG. 5B) or N-to-one as illustrated in FIG. 5A).

In some examples, the step of obtaining comprises obtaining the mapping information from an information element in the first message. For example, as described with reference to FIG. 6A, the CU-CP may transmit the mapping information to the CU-UP in an information element of the first message.

In some examples, mapping information received from the CU-CP may comprise the field value. The field value may map the first bearer to a BH RLC. The mapping may either be one-to-one as illustrated in FIG. 5B) or N-to-one as illustrated in FIG. 5A). Where the mapping is N-to-one, the CU-UP may receive a second message from the CU-CP to setup or modify a second bearer context for a second bearer in the CU-UP, wherein the second message comprises an information element indicating mapping information for mapping the second bearer to the BH RLC channel. In other words, the field value for the first bearer and the second bearer may be the same, thereby providing the N-to-one mapping to the same BH RLC.

In some examples, the field value comprises a differentiated services code point, DSCP, value, in particular, the field value may comprise a DSCP value where N-to-one mapping is used. In some examples the field value comprises a Flow Label value, in particular, the field value may comprise a Flow Label value where one-to-one mapping is used.

As described above with reference to FIG. 6A, in some examples, the mapping information comprises an indication of whether the first bearer is to be mapped one-to-one to the BH RLC link or not. In these examples, the CU-UP may assign the field value associated with the BH RLC channel to the first bearer based on the indication. For example, if the mapping information indicates that the mapping should be one-to-one, the CU-UP may determine a field value for the first bearer ensuring that there is one to one mapping between the first bearer and the BH RLC associated with the field value. Similarly, if the mapping information indicates that the mapping need not be one-to-one, the CU-UP may determine a field value for the first bearer that has an N-to-one mapping with the associated BH RLC (although it will be appreciated that in some examples a one-to-one mapping may also be used in this case).

In some examples, responsive to the mapping information indicating that the first bearer is to be mapped one-to-one, the field value comprises a Flow Label value. In some examples, responsive to the mapping information indicating that the first bearer is to be mapped N-to-one, the field value comprises a DSCP value.

In some examples, the mapping information is not received in the first message. For example, the mapping information may comprise an indication of whether the first bearer is served by an IAB node. In some examples, this indication may be transmitted as part of the first message, but in other examples, the CU-UP may obtain whether the first bearer is served by an IAB node by determining whether the IP Address of an F1-U tunnel for the first bearer has been configured as an IAB node IP Address. In other words, the IP address of the F1-U GTP Tunnel, may have been configured in the CU-UP as an IAB node IP address, prior to the bearer context establishment.

In embodiments where the mapping information comprises an indication of whether the first bearer is served by an IAB node, the CU-UP may be configured such that certain bearers are to be mapped 1:1 (e.g. based on CQI values for an E-UTRA bearer, or 5QI values for NG-RAN bearers corresponding to e.g. Vol P traffic). In some examples, bearers with higher quality of service requirements may be mapped one-to-one, whilst bearers with less high quality of service requirements may be mapped N-to-one. When the CU-UP receives a bearer setup/modification request from the CU-CP, the CU-UP may check whether the bearer is served by an IAB node and if the bearer matches the criteria that mandates 1:1 mapping. If that is the case, the CU-UP may assign a field value with a one-to-one mapping to the bearer and may include the field value in the BEARER CONTEXT SETUP RESPONSE or BEARER CONTEXT MODIFICATION RESPONSE messages. Similarly, if the bearer does not match the criteria that mandates 1:1 mapping, the CU-UP may assign a field value with an N-to-one mapping to the bearer and may include the field value in the BEARER CONTEXT SETUP RESPONSE or BEARER CONTEXT MODIFICATION RESPONSE messages. In some examples, certain Channel Quality Indicator (CQI) values for a E-UTRA bearer and/or 5QI values for NR bearers (or any other quality of service indicator) may be used to determine the N-to-one mapping. For example, CQI values a, b, c may be mapped to a single DSCP value x. DRB Quality of Service (QoS) values may also be used.

With regard to how the CU-UP is configured to know which QCIs or/and NG 5QI (or other QoS indicator) values may require 1:1 mapping, or which QCIs and/or NG 5QI values map to a particular field value in N-to-one mapping, there are several possibilities, for example:

the information may be hard-coded in the CU-UP,
  the information may be communicated from an operations, administration and management (OAM) node,
  the information may be provided from CU-CP via interface management messages (e.g. a gNB-CU-CP CONFIGURATION UPDATE message).

For example, responsive to the first bearer being served by an IAB node, the CU-UP may determine whether the first bearer meets a criteria for one-to-one mapping. Then, responsive to the first bearer meeting the criteria, the CU-UP may assign the field value associated with the RH RLC channel to the first bearer with a one-to-one mapping, and responsive to the first bearer not meeting the criteria, assigning the field value associated with the RH RLC channel to the first bearer with an N-to-one mapping. The criteria may comprise a quality of service criteria.

Similarly to as described above, in embodiments where the CU-UP assigns a field value to the bearer, the CU-UP may keep track of the flow labels that are being assigned to bearers being served via a given IAB node. From the CU-UP's point of view, it may be irrelevant via how many paths the IAB node is accessible, the CU-UP may just ensure that, for a given IP address that it has an F1-U tunnel with, the same field value is not used more than once for UE bearers associated to that IP address of the access IAB node.

In some embodiments a combination of the above examples may be used. For example, for those bearers that always require 1:1 mapping (as configured in the CU-UP via the E-UTRA QCI or the NG 5QI), the CU-CP may not provide any additional mapping information in the first message, while for other bearers the CU-CP may indicate a 1:1 mapping requirement in the first message. Furthermore, for some bearers the CU-UP may make the field value selection, while for other bearers, the CU-CP may make the field value selection.

A selection of non-limiting examples illustrating how some of the embodiments discussed above may be realized in the context of a system that is implemented as discussed in 3GPP TS 38.463 [2] are shown below, with particular reference to sections 9.2.2 and 9.3.1 of 3GPP TS 38.463.

Embodiment 1a

In embodiment 1a, the CU-CP provides an information element "IAB QoS mapping information" in the message "BEARER CONTEXT SETUP REQUEST" or "BEARER CONTEXT MODIFICATION REQUEST". In this embodiment the information element comprises a Flow Label.

9.2.2.1 Bearer Context Setup Request

This message is sent by the gNB-CU-CP to request the gNB-CU-UP to setup a bearer context.

Direction: gNB-CU-CP to gNB-CU-UP

| IE/Group Name | Presence | Range | IE type and reference | Semantics description |
|---|---|---|---|---|
| Message Type | M | | 9.3.1.1 | |
| gNB-CU-CP UE E1AP ID | M | | 9.3.1.4 | |
| Security Information | M | | 9.3.1.10 | |
| UE DL Aggregate Maximum Bit Rate | M | | Bit Rate 9.3.1.20 | |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. |
| Serving PLMN | M | | PLMN Identity 9.3.1.7 | |
| Activity Notification Level | M | | ENUMERATED (DRB, PDU Session, UE, . . . ) | |
| UE Inactivity Timer | O | | Inactivity Timer 9.3.1.54 | Included if the Activity Notification Level is set to UE. |
| Bearer Context Status Change | O | | ENUMERATED (Suspend, Resume, . . . ) | Indicates the status of the Bearer Context |
| CHOICE System | M | | | |
| >E-UTRAN | | | | |
| >>DRB To Setup List | | 1 | | |
| >>>DRB To Setup Item | | 1 . . <maxnoofDRBs> | | |
| >>>>DRB ID | M | | 9.3.1.16 | |
| >>>>PDCP Configuration | M | | 9.3.1.38 | |
| >>>>E-UTRAN QoS | M | | 9.3.1.17 | |
| >>>> IAB QoS mapping information | O | | 9.3.1.x | The IP flow label to be used for one-to-one mapped bearers in IAB network |
| >>>>S1 UL UP Transport Layer Information | M | | UP Transport Layer Information 9.3.2.1 | |

-continued

| IE/Group Name | Presence | Range | IE type and reference | Semantics description |
|---|---|---|---|---|
| >>>>Data Forwarding Information Request | O | | 9.3.2.5 | Requesting forwarding info from the target gNB-CU-UP. |
| >>>>Cell Group Information | M | | 9.3.1.11 | The gNB-CU-UP shall provide one UL UP Transport Layer Information Item per cell group entry. |
| >>>>DL UP Parameters | O | | UP Parameters 9.3.1.13 | |
| >>>>DRB Inactivity Timer | O | | Inactivity Timer 9.3.1.54 | Included if the Activity Notification Level is set to DRB. |
| >>>>Existing Allocated S1 DL UP Transport Layer Information | O | | UP Transport Layer Information 9.3.2.1 | |
| >NG-RAN | | | | |
| >>PDU Session Resource To Setup List | | 1 | | |
| >>>PDU Session Resource To Setup Item | | 1 .. <maxnoofPDUSessionResource> | | |
| >>>>PDU Session ID | M | | 9.3.1.21 | |
| >>>>PDU Session Type | M | | 9.3.1.22 | |
| >>>>S-NSSAI | M | | 9.3.1.9 | |
| >>>>Security Indication | M | | 9.3.1.23 | |
| >>>>PDU Session Resource DL Aggregate Maximum Bit Rate | O | | Bit Rate 9.3.1.20 | This IE shall be present when at least one Non-GBR QoS Flows is being setup. |
| >>>>NG UL UP Transport Layer Information | M | | UP Transport Layer Information 9.3.2.1 | |
| >>>>PDU Session Data Forwarding Information Request | O | | Data Forwarding Information Request 9.3.2.5 | |
| >>>>PDU Session Inactivity Timer | O | | Inactivity Timer 9.3.1.54 | Included if the Activity Notification Level is set to PDU Session. |
| >>>>Existing Allocated NG DL UP Transport Layer Information | O | | UP Transport Layer Information 9.3.2.1 | |
| >>>>Network Instance | O | | 9.3.1.62 | |
| >>>>DRB To Setup List | | 1 | | |
| >>>>>DRB To Setup Item | | 1 .. <maxnoofDRBs> | | |
| >>>>>>DRB ID | M | | 9.3.1.16 | |
| >>>>>>SDAP Configuration | M | | 9.3.1.39 | |
| >>>>>>PDCP Configuration | M | | 9.3.1.38 | |
| >>>>>>Cell Group Information | M | | 9.3.1.11 | The gNB-CU-UP shall provide one UL UP Transport Layer Information Item per cell group entry. |

| IE/Group Name | Presence | Range | IE type and reference | Semantics description |
|---|---|---|---|---|
| >>>>>>QoS Flows Information To Be Setup | M | | QoS Flow QoS Parameters List 9.3.1.25 | |
| >>>>>>IAB QoS mapping information | O | | 9.3.1.x | The IP flow label to be used for one-to-one mapped bearers in IAB network |
| >>>>>>DRB Data forwarding information Request | O | | Data Forwarding Information Request 9.3.2.5 | Requesting forwarding info from the target gNB-CU-UP. |
| >>>>>>DRB Inactivity Timer | O | | Inactivity Timer 9.3.1.54 | Included if the Activity Notification Level is set to DRB. |
| >>>>PDCP SN Status Information | O | | 9.3.1.58 | Contains the PDCP SN Status at setup after Resume. |

9.3.1.x IAB QoS Mapping Information

Having received the message "BEARER CONTEXT SETUP REQUEST" above, the gNB-CU-UP may transmit the following information to the transport layer for inclusion in the IPv6 header of the DL User Plane packets for a given DRB.

| IE/Group Name | Presence | Range | IE type and reference | Semantics description |
|---|---|---|---|---|
| IAB QoS mapping information | M | | BIT STRING (20) | Represents the Flow Label value to be used by the transport layer for the DL User Plane packets for a given DRB |

Embodiment 1b

In embodiment 1b, the CU-CP provides an information element "IAB bearer mapping" in the message "BEARER CONTEXT SETUP REQUEST" or "BEARER CONTEXT MODIFICATION REQUEST" message. In this embodiment the information element In IAB network, indicates whether the bearer is to be mapped one to one or not.

9.2.2.1 Bearer Context Setup Request

This message is sent by the gNB-CU-CP to request the gNB-CU-UP to setup a bearer context.

Direction: gNB-CU-CP→gNB-CU-UP

| IE/Group Name | Presence | Range | IE type and reference | Semantics description |
|---|---|---|---|---|
| Message Type | M | | 9.3.1.1 | |
| gNB-CU-CP UE E1AP ID | M | | 9.3.1.4 | |
| Security Information | M | | 9.3.1.10 | |
| UE DL Aggregate Maximum Bit Rate | M | | Bit Rate 9.3.1.20 | |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. |

-continued

| IE/Group Name | Presence | Range | IE type and reference | Semantics description |
|---|---|---|---|---|
| Serving PLMN | M | | PLMN Identity 9.3.1.7 | |
| Activity Notification Level | M | | ENUMERATED (DRB, PDU Session, UE, . . . ) | |
| UE Inactivity Timer | O | | Inactivity Timer 9.3.1.54 | Included if the Activity Notification Level is set to UE. |
| Bearer Context Status Change | O | | ENUMERATED (Suspend, Resume, . . . ) | Indicates the status of the Bearer Context |
| CHOICE System | M | | | |
| >E-UTRAN | | | | |
| >>DRB To Setup List | | 1 | | |
| >>>DRB To Setup Item | | 1 . . <maxnoofDRBs> | | |
| >>>>DRB ID | M | | 9.3.1.16 | |
| >>>>PDCP Configuration | M | | 9.3.1.38 | |
| >>>>E-UTRAN QoS | M | | 9.3.1.17 | |
| >>>> IAB bearer mapping | O | ENUMERATED (1-to-1, . . . ) | | In IAB network, indicates whether the bearer is to be mapped one to one or not. |
| >>>>S1 UL UP Transport Layer Information | M | | UP Transport Layer Information 9.3.2.1 | |
| >>>>Data Forwarding Information Request | O | | 9.3.2.5 | Requesting forwarding info from the target gNB-CU-UP. |
| >>>>Cell Group Information | M | | 9.3.1.11 | The gNB-CU-UP shall provide one UL UP Transport Layer Information Item per cell group entry. |
| >>>>DL UP Parameters | O | | UP Parameters 9.3.1.13 | |
| >>>>DRB Inactivity Timer | O | | Inactivity Timer 9.3.1.54 | Included if the Activity Notification Level is set to DRB. |
| >>>>Existing Allocated S1 DL UP Transport Layer Information | O | | UP Transport Layer Information 9.3.2.1 | |
| >NG-RAN | | | | |
| >>PDU Session Resource To Setup List | | 1 | | |
| >>>PDU Session Resource To Setup Item | | 1 . . <maxnoofPDUSessionResource> | | |
| >>>>PDU Session ID | M | | 9.3.1.21 | |
| >>>>PDU Session Type | M | | 9.3.1.22 | |
| >>>>S-NSSAI | M | | 9.3.1.9 | |
| >>>>Security Indication | M | | 9.3.1.23 | |
| >>>>PDU Session Resource DL Aggregate Maximum Bit Rate | O | | Bit Rate 9.3.1.20 | This IE shall be present when at least one Non-GBR QoS Flows is being setup. |
| >>>>NG UL UP Transport Layer Information | M | | UP Transport Layer Information 9.3.2.1 | |

| IE/Group Name | Presence | Range | IE type and reference | Semantics description |
|---|---|---|---|---|
| >>>>PDU Session Data Forwarding Information Request | O | | Data Forwarding Information Request 9.3.2.5 | |
| >>>>PDU Session Inactivity Timer | O | | Inactivity Timer 9.3.1.54 | Included if the Activity Notification Level is set to PDU Session. |
| >>>>Existing Allocated NG DL UP Transport Layer Information | O | | UP Transport Layer Information 9.3.2.1 | |
| >>>>Network Instance | O | | 9.3.1.62 | |
| >>>>DRB To Setup List | | 1 | | |
| >>>>>DRB To Setup Item | | 1..<maxnoofDRBs> | | |
| >>>>>>DRB ID | M | | 9.3.1.16 | |
| >>>>>>SDAP Configuration | M | | 9.3.1.39 | |
| >>>>>>PDCP Configuration | M | | 9.3.1.38 | |
| >>>>>>Cell Group Information | M | | 9.3.1.11 | The gNB-CU-UP shall provide one UL UP Transport Layer Information Item per cell group entry. |
| >>>>>>QoS Flows Information To Be Setup | M | | QoS Flow QoS Parameters List 9.3.1.25 | |
| >>>>>>IAB bearer mapping | O | ENUMERATED (1-to-1, . . . ) | | In IAB network, indicates whether the bearer is to be mapped one to one or not. |
| >>>>>>DRB Data forwarding information Request | O | | Data Forwarding Information Request 9.3.2.5 | Requesting forwarding info from the target gNB-CU-UP. |
| >>>>>>DRB Inactivity Timer | O | | Inactivity Timer 9.3.1.54 | Included if the Activity Notification Level is set to DRB. |
| >>>>PDCP SN Status Information | O | | 9.3.1.58 | Contains the PDCP SN Status at setup after Resume. |

9.2.2.2 Bearer Context Setup Response

This message may be transmitted by the gNB-CU-UP to the gNB CU-CP to confirm the setup of the requested bearer context.

The message may comprise an information element "IAB QoS mapping information" indicating the field value that the CU-UP has assigned to the bearer in response to the message "BEARER CONTEXT SETUP REQUEST" above.

Direction: gNB-CU-UP→gNB-CU-CP

| IE/Group Name | Presence | Range | IE type and reference | Semantics description |
|---|---|---|---|---|
| Message Type | M | | 9.3.1.1 | |
| gNB-CU-CP UE E1AP ID | M | | 9.3.1.4 | |
| gNB-CU-UP UE E1AP ID | M | | 9.3.1.5 | |
| CHOICE System | M | | | |
| >E-UTRAN | | | | |
| >>DRB Setup List | | 1 | | |
| >>>DRB Setup Item | | 1..<maxnoofDRBs> | | |

| IE/Group Name | Presence | Range | IE type and reference | Semantics description |
| --- | --- | --- | --- | --- |
| >>>>DRB ID | M | | 9.3.1.16 | |
| >>>> IAB QoS mapping information | O | | 9.3.1.x | The IP flow label to be used for one-to-one mapped bearers in IAB network |
| >>>>Data Forwarding Information Response | O | | 9.3.2.6 | Providing forwarding info from the target gNB-CU-UP. |
| >>>>UL UP Parameters | M | | UP Parameters 9.3.1.13 | |
| >>>>S1 DL UP Unchanged | O | | ENUMERATED (True, . . . ) | |
| >>DRB Failed List | | 0 . . 1 | | |
| >>>DRB Failed Item | | 1 . . <maxnoofDRBs> | | |
| >>>>DRB ID | M | | 9.3.1.16 | |
| >>>>Cause | M | | 9.3.1.2 | |
| >NG-RAN | | | | |
| >>PDU Session Resource Setup List | | 1 | | |
| >>>PDU Session Resource Setup Item | | 1 . . <maxnoofPDUSessionResource> | | |
| >>>>PDU Session ID | M | | 9.3.1.21 | |
| >>>>Security Result | O | | 9.3.1.52 | |
| >>>>NG DL UP Transport Layer Information | M | | UP Transport Layer Information 9.3.2.1 | |
| >>>>PDU Session Data Forwarding Information Response | O | | Data Forwarding Information Response 9.3.2.6 | Providing forwarding info from the target gNB-CU-UP. |
| >>>>NG DL UP Unchanged | O | | ENUMERATED (True, . . . ) | |
| >>>>DRB Setup List | | 1 | | |
| >>>>>DRB Setup Item | | 1 . . <maxnoofDRBs> | | |
| >>>>>>DRB ID | M | | 9.3.1.16 | |
| >>>>>>DRB Data forwarding information Response | O | | Data Forwarding Information Response 9.3.2.6 | Providing forwarding info from the target gNB-CU-UP. |
| >>>>>> IAB QoS mapping information | O | | 9.3.1.x | The IP flow label to be used for one-to-one mapped bearers in IAB network |
| >>>>>>UL UP Parameters | M | | UP Parameters 9.3.1.13 | |
| >>>>>>Flow Setup List | M | | QoS Flow List 9.3.1.12 | |
| >>>>>>Flow Failed List | O | | Flow Failed List 9.3.1.45 | |
| >>>>DRB Failed List | | 0 . . 1 | | |
| >>>>>DRB Failed Item | | 1 . . <maxnoofDRBs> | | |
| >>>>>>DRB ID | M | | 9.3.1.16 | |
| >>>>>>Cause | M | | 9.3.1.2 | |
| >>PDU Session Resource Failed List | | 0 . . 1 | | |

| IE/Group Name | Presence | Range | IE type and reference | Semantics description |
|---|---|---|---|---|
| >>>PDU Session Resource Failed Item | | 1 .. <maxnoofPDUSessionResource> | | |
| >>>>PDU Session ID | M | | 9.3.1.21 | |
| >>>>Cause | M | | 9.3.1.2 | |

9.3.1.x IAB QoS Mapping Information

The g NB-CU-UP may transmit this information to the transport layer for inclusion in the IPv6 header of the DL User Plane packets for a given DRB.

| IE/Group Name | Presence | Range | IE type and reference | Semantics description |
|---|---|---|---|---|
| IAB QoS mapping information | M | | BIT STRING (20) | Represents the Flow Label value to be used by the transport layer for the DL User Plane packets for a given DRB |

Embodiment 1c

In embodiment 1c, the CU-CP provides an information element "IAB bearer" in the message "BEARER CONTEXT SETUP REQUEST". In this embodiment the information element In IAB network, indicates whether the bearer is served by an IAB node or not.

9.2.2.1 Bearer Context Setup Request

This message is sent by the gNB-CU-CP to request the gNB-CU-UP to setup a bearer context.

Direction: gNB-CU-CP→gNB-CU-UP

| IE/Group Name | Presence | Range | IE type and reference | Semantics description |
|---|---|---|---|---|
| Message Type | M | | 9.3.1.1 | |
| gNB-CU-CP UE E1AP ID | M | | 9.3.1.4 | |
| Security Information | M | | 9.3.1.10 | |
| UE DL Aggregate Maximum Bit Rate | M | | Bit Rate 9.3.1.20 | |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. |
| Serving PLMN | M | | PLMN Identity 9.3.1.7 | |
| Activity Notification Level | M | | ENUMERATED (DRB, PDU Session, UE, . . . ) | |
| UE Inactivity Timer | O | | Inactivity Timer 9.3.1.54 | Included if the Activity Notification Level is set to UE. |
| Bearer Context Status Change | O | | ENUMERATED (Suspend, Resume, . . . ) | Indicates the status of the Bearer Context |
| CHOICE System | M | | | |
| >E-UTRAN | | | | |
| >>DRB To Setup List | | 1 | | |
| >>>DRB To Setup Item | | 1 .. <maxnoofDRBs> | | |
| >>>>DRB ID | M | | 9.3.1.16 | |
| >>>>PDCP Configuration | M | | 9.3.1.38 | |

-continued

| IE/Group Name | Presence | Range | IE type and reference | Semantics description |
|---|---|---|---|---|
| >>>>E-UTRAN QoS | M | | 9.3.1.17 | |
| >>>>S1 UL UP Transport Layer Information | M | | UP Transport Layer Information 9.3.2.1 | |
| >>>>Data Forwarding Information Request | O | | 9.3.2.5 | Requesting forwarding info from the target gNB-CU-UP. |
| >>>>Cell Group Information | M | | 9.3.1.11 | The gNB-CU-UP shall provide one UL UP Transport Layer Information Item per cell group entry. |
| >>>>DL UP Parameters | O | | UP Parameters 9.3.1.13 | |
| >>>>DRB Inactivity Timer | O | | Inactivity Timer 9.3.1.54 | Included if the Activity Notification Level is set to DRB. |
| >>>>Existing Allocated S1 DL UP Transport Layer Information | O | | UP Transport Layer Information 9.3.2.1 | |
| >>>>IAB Bearer | O | ENUMERATED (IAB-bearer, . . . ) | | Indicates if the bearer is served by an IAB node |
| >NG-RAN >>PDU Session Resource To Setup List | | 1 | | |
| >>>PDU Session Resource To Setup Item | | 1 .. <maxnoofPDUSessionResource> | | |
| >>>>PDU Session ID | M | | 9.3.1.21 | |
| >>>>PDU Session Type | M | | 9.3.1.22 | |
| >>>>S-NSSAI | M | | 9.3.1.9 | |
| >>>>Security Indication | M | | 9.3.1.23 | |
| >>>>PDU Session Resource DL Aggregate Maximum Bit Rate | O | | Bit Rate 9.3.1.20 | This IE shall be present when at least one Non-GBR QoS Flows is being setup. |
| >>>>NG UL UP Transport Layer Information | M | | UP Transport Layer Information 9.3.2.1 | |
| >>>>PDU Session Data Forwarding Information Request | O | | Data Forwarding Information Request 9.3.2.5 | |
| >>>>PDU Session Inactivity Timer | O | | Inactivity Timer 9.3.1.54 | Included if the Activity Notification Level is set to PDU Session. |
| >>>>Existing Allocated NG DL UP Transport Layer Information | O | | UP Transport Layer Information 9.3.2.1 | |
| >>>>Network Instance | O | | 9.3.1.62 | |
| >>>>DRB To Setup List | | 1 | | |
| >>>>>DRB To Setup Item | | 1 .. <maxnoofDRBs> | | |
| >>>>>>DRB ID | M | | 9.3.1.16 | |
| >>>>>>SDAP Configuration | M | | 9.3.1.39 | |

| IE/Group Name | Presence | Range | IE type and reference | Semantics description |
|---|---|---|---|---|
| >>>>>>PDCP Configuration | M | | 9.3.1.38 | |
| >>>>>>Cell Group Information | M | | 9.3.1.11 | The gNB-CU-UP shall provide one UL UP Transport Layer Information Item per cell group entry. |
| >>>>>>QoS Flows Information To Be Setup | M | | QoS Flow QoS Parameters List 9.3.1.25 | |
| >>>>>>DRB Data forwarding information Request | O | | Data Forwarding Information Request 9.3.2.5 | Requesting forwarding info from the target gNB-CU-UP. |
| >>>>>>DRB Inactivity Timer | O | | Inactivity Timer 9.3.1.54 | Included if the Activity Notification Level is set to DRB. |
| >>>>PDCP SN Status Information | O | | 9.3.1.58 | Contains the PDCP SN Status at setup after Resume. |
| >>>>>>IAB Bearer | O | ENUMERATED (IAB-bearer, ...) | | Indicates if the bearer is served by an IAB node |

| Range bound | Explanation |
|---|---|
| MaxnoofDRBs | Maximum no. of DRBs for a UE. Value is 32. |
| maxnoofPDUSessionResource | Maximum no. of PDU Sessions for a UE. Value is 256. |

9.2.2.2 Bearer Context Setup Response

This message may be transmitted by the gNB-CU-UP to the gNB-CU-CP to confirm the setup of the requested bearer context in response to the "BEARER CONTEXT SETUP REQUEST" above. This message may comprise an information element "IAB QoS mapping information" indicating the field value assigned to the bearer by the gNB-CU-UP. Direction: gNB-CU-UP→gNB-CU-CP

| IE/Group Name | Presence | Range | IE type and reference | Semantics description |
|---|---|---|---|---|
| Message Type | M | | 9.3.1.1 | |
| gNB-CU-CP UE E1AP ID | M | | 9.3.1.4 | |
| gNB-CU-UP UE E1AP ID | M | | 9.3.1.5 | |
| CHOICE System | M | | | |
| >E-UTRAN | | | | |
| >>DRB Setup List | | 1 | | |
| >>>DRB Setup Item | | 1.. <maxnoofDRBs> | | |
| >>>>DRB ID | M | | 9.3.1.16 | |
| >>>> IAB QoS mapping information | O | | 9.3.1.x | The IP flow label to be used for one-to-one mapped bearers in IAB network |
| >>>>Data Forwarding Information Response | O | | 9.3.2.6 | Providing forwarding info from the target gNB-CU-UP. |
| >>>>UL UP Parameters | M | | UP Parameters 9.3.1.13 | |
| >>>>S1 DL UP Unchanged | O | | ENUMERATED (True, ...) | |
| >>DRB Failed List | | 0..1 | | |
| >>>DRB Failed Item | | 1.. <maxnoofDRBs> | | |

-continued

| IE/Group Name | Presence | Range | IE type and reference | Semantics description |
|---|---|---|---|---|
| >>>>DRB ID | M | | 9.3.1.16 | |
| >>>>Cause | M | | 9.3.1.2 | |
| >NG-RAN >>PDU Session Resource Setup List | | 1 | | |
| >>>PDU Session Resource Setup Item | | 1 .. \<maxnoofPDUSessionResource> | | |
| >>>>PDU Session ID | M | | 9.3.1.21 | |
| >>>>Security Result | O | | 9.3.1.52 | |
| >>>>NG DL UP Transport Layer Information | M | | UP Transport Layer Information 9.3.2.1 | |
| >>>>PDU Session Data Forwarding Information Response | O | | Data Forwarding Information Response 9.3.2.6 | Providing forwarding info from the target gNB-CU-UP. |
| >>>>NG DL UP Unchanged | O | | ENUMERATED (True, ... ) | |
| >>>>DRB Setup List | | 1 | | |
| >>>>>DRB Setup Item | | 1 .. \<maxnoofDRBs> | | |
| >>>>>>DRB ID | M | | 9.3.1.16 | |
| >>>>>>DRB Data forwarding information Response | O | | Data Forwarding Information Response 9.3.2.6 | Providing forwarding info from the target gNB-CU-UP. |
| >>>>>> IAB QoS mapping information | O | | 9.3.1.x | The IP flow label to be used for one-to-one mapped bearers in IAB network |
| >>>>>>UL UP Parameters | M | | UP Parameters 9.3.1.13 | |
| >>>>>>Flow Setup List | M | | QoS Flow List 9.3.1.12 | |
| >>>>>>Flow Failed List | O | | Flow Failed List 9.3.1.45 | |
| >>>>DRB Failed List | | 0 .. 1 | | |
| >>>>>DRB Failed Item | | 1 .. \<maxnoofDRBs> | | |
| >>>>>>DRB ID | M | | 9.3.1.16 | |
| >>>>>>Cause | M | | 9.3.1.2 | |
| >>PDU Session Resource Failed List | | 0 .. 1 | | |
| >>>PDU Session Resource Failed Item | | 1 .. \<maxnoofPDUSessionResource> | | |
| >>>>PDU Session ID | M | | 9.3.1.21 | |
| >>>>Cause | M | | 9.3.1.2 | |

9.3.1.x IAB QoS Mapping Information

The gNB-CU-UP may transmit this information to the transport layer for inclusion in the IPv6 header of the DL User Plane packets for a given DRB

| IE/Group Name | Presence | Range | IE type and reference | Semantics description |
|---|---|---|---|---|
| IAB QoS mapping information | M | | BIT STRING (20) | Represents the Flow Label value to be used by the transport layer for the DL User Plane packets for a given DRB |

Embodiment 2a

In embodiment 2a, the CU-CP provides an information element "IAB QoS mapping information" in the message "BEARER CONTEXT SETUP REQUEST". In this embodiment the information element indicates a DSCP value associated with a bearer to be used in N-to-one mapping.

9.2.2.1 Bearer Context Setup Request

This message is sent by the gNB-CU-CP to request the gNB-CU-UP to setup a bearer context.

Direction: gNB-CU-CP → gNB-CU-UP

| IE/Group Name | Presence | Range | IE type and reference | Semantics description |
|---|---|---|---|---|
| Message Type | M | | 9.3.1.1 | |
| gNB-CU-CP UE E1AP ID | M | | 9.3.1.4 | |
| Security Information | M | | 9.3.1.10 | |
| UE DL Aggregate Maximum Bit Rate | M | | Bit Rate 9.3.1.20 | |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. |
| Serving PLMN | M | | PLMN Identity 9.3.1.7 | |
| Activity Notification Level | M | | ENUMERATED (DRB, PDU Session, UE, . . . ) | |
| UE Inactivity Timer | O | | Inactivity Timer 9.3.1.54 | Included if the Activity Notification Level is set to UE. |
| Bearer Context Status Change | O | | ENUMERATED (Suspend, Resume, . . . ) | Indicates the status of the Bearer Context |
| CHOICE System | M | | | |
| >E-UTRAN | | | | |
| >>DRB To Setup List | | 1 | | |
| >>>DRB To Setup Item | | 1 . . <maxnoofDRBs> | | |
| >>>>DRB ID | M | | 9.3.1.16 | |
| >>>>PDCP Configuration | M | | 9.3.1.38 | |
| >>>>E-UTRAN QoS | M | | 9.3.1.17 | |
| >>>> IAB QoS mapping information | O | | 9.3.1.y | The DSCP to be used for the N:1 mapped bearers in IAB network |
| >>>>S1 UL UP Transport Layer Information | M | | UP Transport Layer Information 9.3.2.1 | |
| >>>>Data Forwarding Information Request | O | | 9.3.2.5 | Requesting forwarding info from the target gNB-CU-UP. |
| >>>>Cell Group Information | M | | 9.3.1.11 | The gNB-CU-UP shall provide one UL UP Transport Layer Information Item per cell group entry. |
| >>>>DL UP Parameters | O | | UP Parameters 9.3.1.13 | |
| >>>>DRB Inactivity Timer | O | | Inactivity Timer 9.3.1.54 | Included if the Activity Notification Level is set to DRB. |

| IE/Group Name | Presence | Range | IE type and reference | Semantics description |
|---|---|---|---|---|
| >>>>Existing Allocated S1 DL UP Transport Layer Information | O | | UP Transport Layer Information 9.3.2.1 | |
| >NG-RAN | | | | |
| >>PDU Session Resource To Setup List | | 1 | | |
| >>>PDU Session Resource To Setup Item | | 1 .. \<maxnoofPDUSessionResource> | | |
| >>>>PDU Session ID | M | | 9.3.1.21 | |
| >>>>PDU Session Type | M | | 9.3.1.22 | |
| >>>>S-NSSAI | M | | 9.3.1.9 | |
| >>>>Security Indication | M | | 9.3.1.23 | |
| >>>>PDU Session Resource DL Aggregate Maximum Bit Rate | O | | Bit Rate 9.3.1.20 | This IE shall be present when at least one Non-GBR QoS Flows is being setup. |
| >>>>NG UL UP Transport Layer Information | M | | UP Transport Layer Information 9.3.2.1 | |
| >>>>PDU Session Data Forwarding Information Request | O | | Data Forwarding Information Request 9.3.2.5 | |
| >>>>PDU Session Inactivity Timer | O | | Inactivity Timer 9.3.1.54 | Included if the Activity Notification Level is set to PDU Session. |
| >>>>Existing Allocated NG DL UP Transport Layer Information | O | | UP Transport Layer Information 9.3.2.1 | |
| >>>>Network Instance | O | | 9.3.1.62 | |
| >>>>DRB To Setup List | | 1 | | |
| >>>>>DRB To Setup Item | | 1 .. \<maxnoofDRBs> | | |
| >>>>>>DRB ID | M | | 9.3.1.16 | |
| >>>>>>SDAP Configuration | M | | 9.3.1.39 | |
| >>>>>>PDCP Configuration | M | | 9.3.1.38 | |
| >>>>>>Cell Group Information | M | | 9.3.1.11 | The gNB-CU-UP shall provide one UL UP Transport Layer Information Item per cell group entry. |
| >>>>>>QoS Flows Information To Be Setup | M | | QoS Flow QoS Parameters List 9.3.1.25 | |
| >>>>>>IAB QoS mapping information | O | | 9.3.1.y | The DSCP to be used for the N:1 mapped bearers in IAB network |
| >>>>>>DRB Data forwarding information Request | O | | Data Forwarding Information Request 9.3.2.5 | Requesting forwarding info from the target gNB-CU-UP. |
| >>>>>>DRB Inactivity Timer | O | | Inactivity Timer 9.3.1.54 | Included if the Activity Notification Level is set to DRB. |

-continued

| IE/Group Name | Presence | Range | IE type and reference | Semantics description |
|---|---|---|---|---|
| >>>>PDCP SN Status Information | O | | 9.3.1.58 | Contains the PDCP SN Status at setup after Resume. |

9.3.1.y IAB QoS Mapping Information

The gNB-CU-UP may transmit this information to the transport layer for inclusion in the IP header of the DL User Plane packets for a given DRB,

| IE/Group Name | Presence | Range | IE type and reference | Semantics description |
|---|---|---|---|---|
| IAB QoS mapping information | M | | BIT STRING (6) | Represents the DSCP value to be used by the transport layer for the DL User Plane packets for a given DRB |

Embodiment 3

A combined signaling mechanism as discussed in embodiment 3 may be used to indicate either a DSCP or a flow label for a given bearer (i.e. to cover both embodiments 1a and 2a at the same time).

9.2.2.1 Bearer Context Setup Request

This message is sent by the gNB-CU-CP to request the gNB-CU-UP to setup a bearer context.

Direction: gNB-CU-CP ⌐ gNB-CU-UP

| IE/Group Name | Presence | Range | IE type and reference | Semantics description |
|---|---|---|---|---|
| Message Type | M | | 9.3.1.1 | |
| gNB-CU-CP UE E1AP ID | M | | 9.3.1.4 | |
| Security Information | M | | 9.3.1.10 | |
| UE DL Aggregate Maximum Bit Rate | M | | Bit Rate 9.3.1.20 | |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. |
| Serving PLMN | M | | PLMN Identity 9.3.1.7 | |
| Activity Notification Level | M | | ENUMERATED (DRB, PDU Session, UE, ...) | |
| UE Inactivity Timer | O | | Inactivity Timer 9.3.1.54 | Included if the Activity Notification Level is set to UE. |
| Bearer Context Status Change | O | | ENUMERATED (Suspend, Resume, ...) | Indicates the status of the Bearer Context |
| CHOICE System | M | | | |
| >E-UTRAN | | | | |
| >>DRB To Setup List | | 1 | | |
| >>>DRB To Setup Item | | 1 .. <maxnoofDRBs> | | |
| >>>>DRB ID | M | | 9.3.1.16 | |
| >>>>PDCP Configuration | M | | 9.3.1.38 | |
| >>>>E-UTRAN QoS | M | | 9.3.1.17 | |

-continued

| IE/Group Name | Presence | Range | IE type and reference | Semantics description |
|---|---|---|---|---|
| >>>> IAB QoS mapping information | O | | 9.3.1.z | The DSCP or IP flow label to be used for the N:1 or 1:1 mapped bearers in IAB network, respectively |
| >>>>S1 UL UP Transport Layer Information | M | | UP Transport Layer Information 9.3.2.1 | |
| >>>>Data Forwarding Information Request | O | | 9.3.2.5 | Requesting forwarding info from the target gNB-CU-UP. |
| >>>>Cell Group Information | M | | 9.3.1.11 | The gNB-CU-UP shall provide one UL UP Transport Layer Information Item per cell group entry. |
| >>>>DL UP Parameters | O | | UP Parameters 9.3.1.13 | |
| >>>>DRB Inactivity Timer | O | | Inactivity Timer 9.3.1.54 | Included if the Activity Notification Level is set to DRB. |
| >>>>Existing Allocated S1 DL UP Transport Layer Information | O | | UP Transport Layer Information 9.3.2.1 | |
| >NG-RAN | | | | |
| >>PDU Session Resource To Setup List | | 1 | | |
| >>>PDU Session Resource To Setup Item | | 1 .. <maxnoofPDUSessionResource> | | |
| >>>>PDU Session ID | M | | 9.3.1.21 | |
| >>>>PDU Session Type | M | | 9.3.1.22 | |
| >>>>S-NSSAI | M | | 9.3.1.9 | |
| >>>>Security Indication | M | | 9.3.1.23 | |
| >>>>PDU Session Resource DL Aggregate Maximum Bit Rate | O | | Bit Rate 9.3.1.20 | This IE shall be present when at least one Non-GBR QoS Flows is being setup. |
| >>>>NG UL UP Transport Layer Information | M | | UP Transport Layer Information 9.3.2.1 | |
| >>>>PDU Session Data Forwarding Information Request | O | | Data Forwarding Information Request 9.3.2.5 | |
| >>>>PDU Session Inactivity Timer | O | | Inactivity Timer 9.3.1.54 | Included if the Activity Notification Level is set to PDU Session. |
| >>>>Existing Allocated NG DL UP Transport Layer Information | O | | UP Transport Layer Information 9.3.2.1 | |
| >>>>Network Instance | O | | 9.3.1.62 | |
| >>>>DRB To Setup List | | 1 | | |
| >>>>>DRB To Setup Item | | 1 .. <maxnoofDRBs> | | |
| >>>>>>DRB ID | M | | 9.3.1.16 | |
| >>>>>>SDAP Configuration | M | | 9.3.1.39 | |
| >>>>>>PDCP Configuration | M | | 9.3.1.38 | |
| >>>>>>Cell Group Information | M | | 9.3.1.11 | The gNB-CU-UP shall provide one UL UP Transport Layer Information Item per cell group entry. |

-continued

| IE/Group Name | Presence | Range | IE type and reference | Semantics description |
|---|---|---|---|---|
| >>>>>>QoS Flows Information To Be Setup | M | | QoS Flow QoS Parameters List 9.3.1.25 | |
| >>>>>> IAB QoS mapping information | O | | 9.3.1.z | The DSCP or IP flow label to be used for the N:1 or 1:1 mapped bearers in IAB network, respectively |
| >>>>>>DRB Data forwarding information Request | O | | Data Forwarding Information Request 9.3.2.5 | Requesting forwarding info from the target gNB-CU-UP. |
| >>>>>>DRB Inactivity Timer | O | | Inactivity Timer 9.3.1.54 | Included if the Activity Notification Level is set to DRB. |
| >>>>PDCP SN Status Information | O | | 9.3.1.58 | Contains the PDCP SN Status at setup after Resume. |
| >>>>>>DRB QoS | O | | 9.3.1.26 | Indicates the DRB QoS when more than one QoS Flow is mapped to the DRB. |

9.3.1.z IAB QoS Mapping Information

The gNB-CU-UP may send this information to the transport layer for inclusion in the IP header of the DL User Plane packets for a given DRB

| IE/Group Name | Presence | Range | IE type and reference | Semantics description |
|---|---|---|---|---|
| Choice IAB QOS mapping information | M | | | |
| > IP Flow Label | | | BIT STRING (20) | Represents the Flow Label value to be used by the transport layer for the DL User Plane packets for a given DRB |
| > DSCP | | | BIT STRING (6) | Represents the DSCP value to be used by the transport layer for the DL User Plane packets for a given DRB |

In case both the IP Flow label and the DSCP have to be used to map a certain bearer N-to-1, the IAB QoS mapping information IE may be restructured as shown below:

| IE/Group Name | Presence | Range | IE type and reference | Semantics description |
|---|---|---|---|---|
| IP Flow Label | O | | BIT STRING (20) | Represents the Flow Label value to be used by the transport layer for the DL User Plane packets for a given DRB |
| DSCP | O | | BIT STRING (6) | Represents the DSCP value to be used by the transport layer for the DL User Plane packets for a given DRB |

Figure 7:
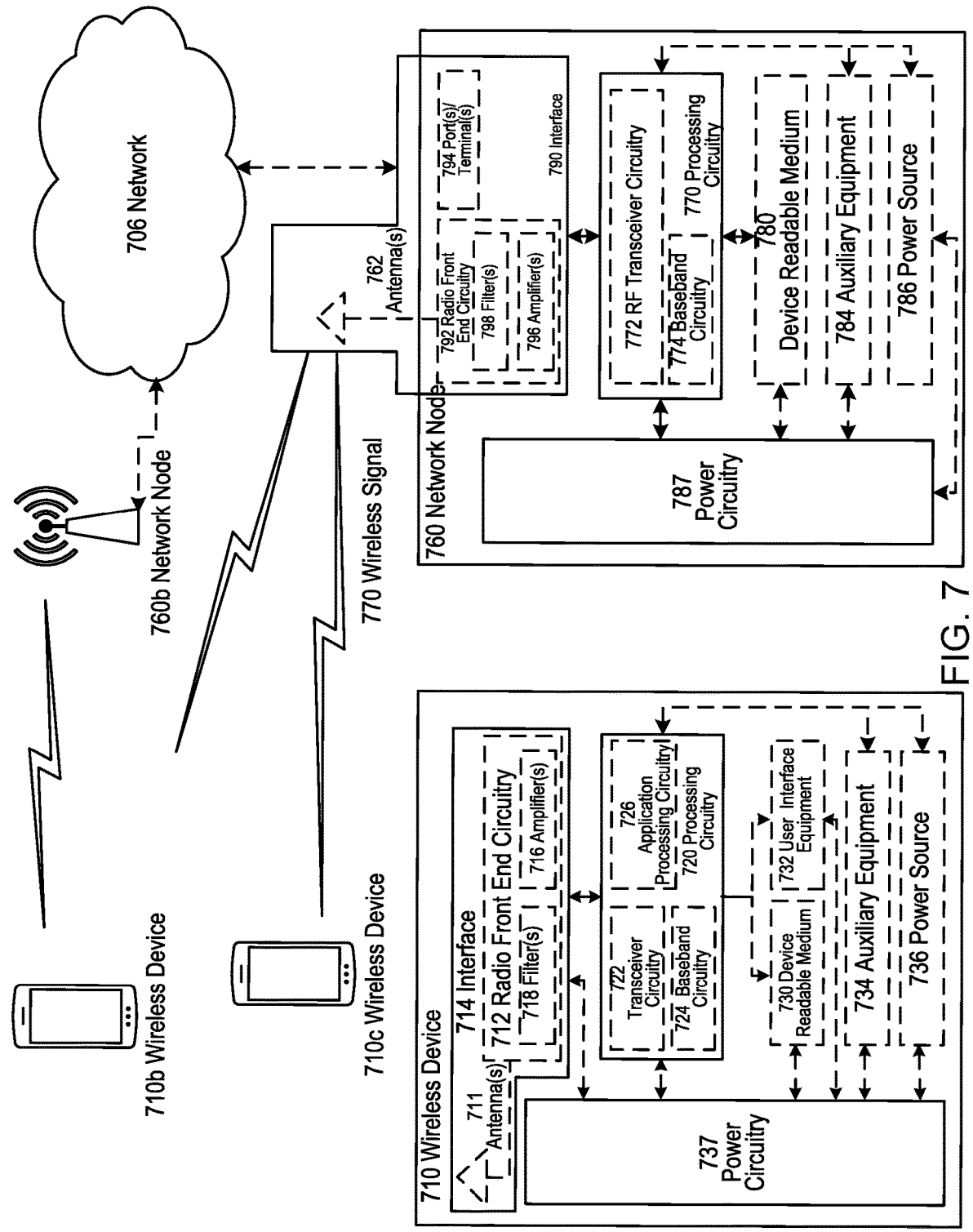
FIG. 7 is a schematic diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760*b*, and WDs 710, 710*b*, and 710*c*. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail.

Figure 1A:
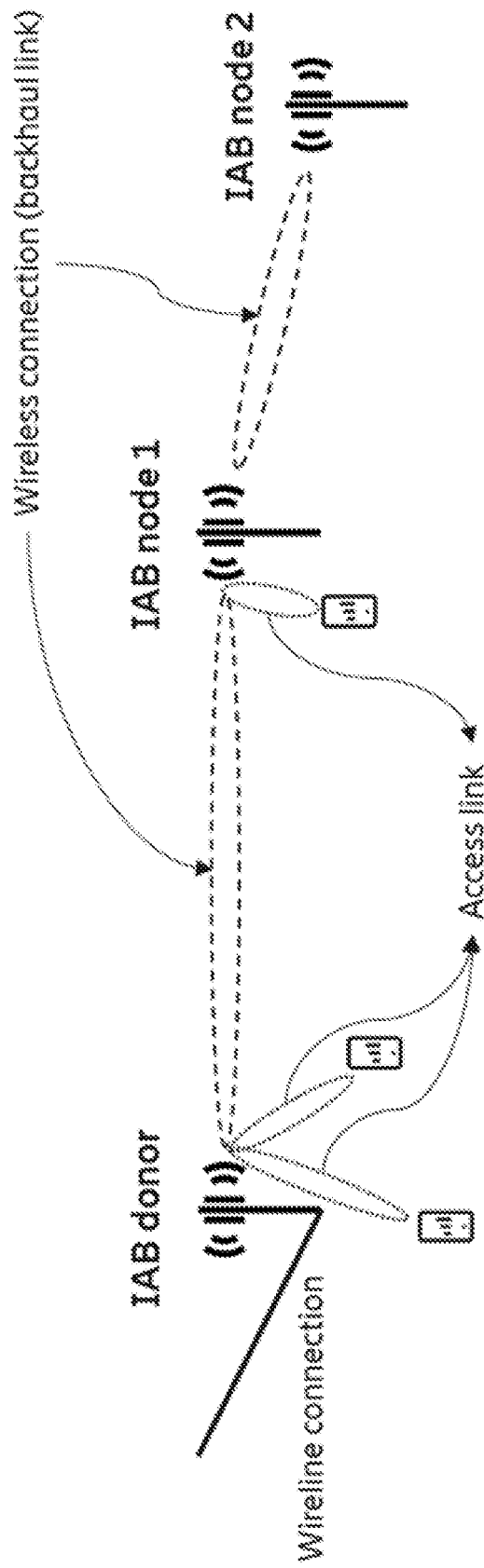
FIG. 1A is a schematic diagram of a multi-hop deployment in an IAB network.
Figure 1B:
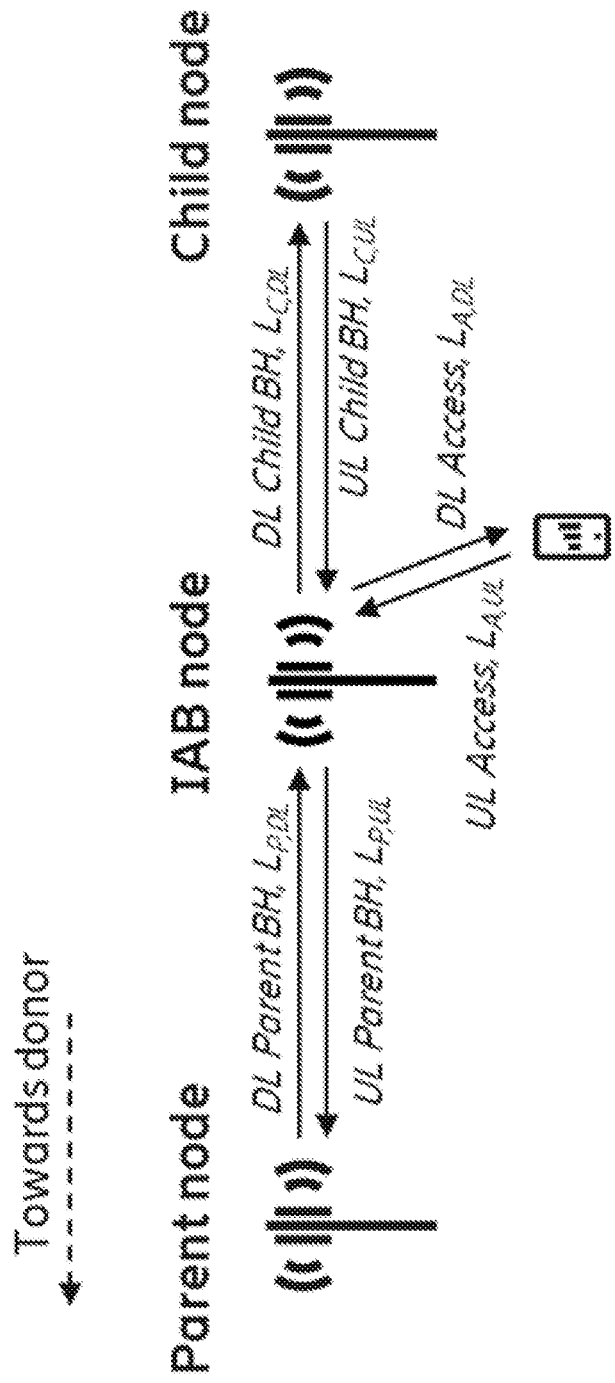
FIG. 1B is a diagram indicating IAB terminology in adjacent hops.
Figure 2A:
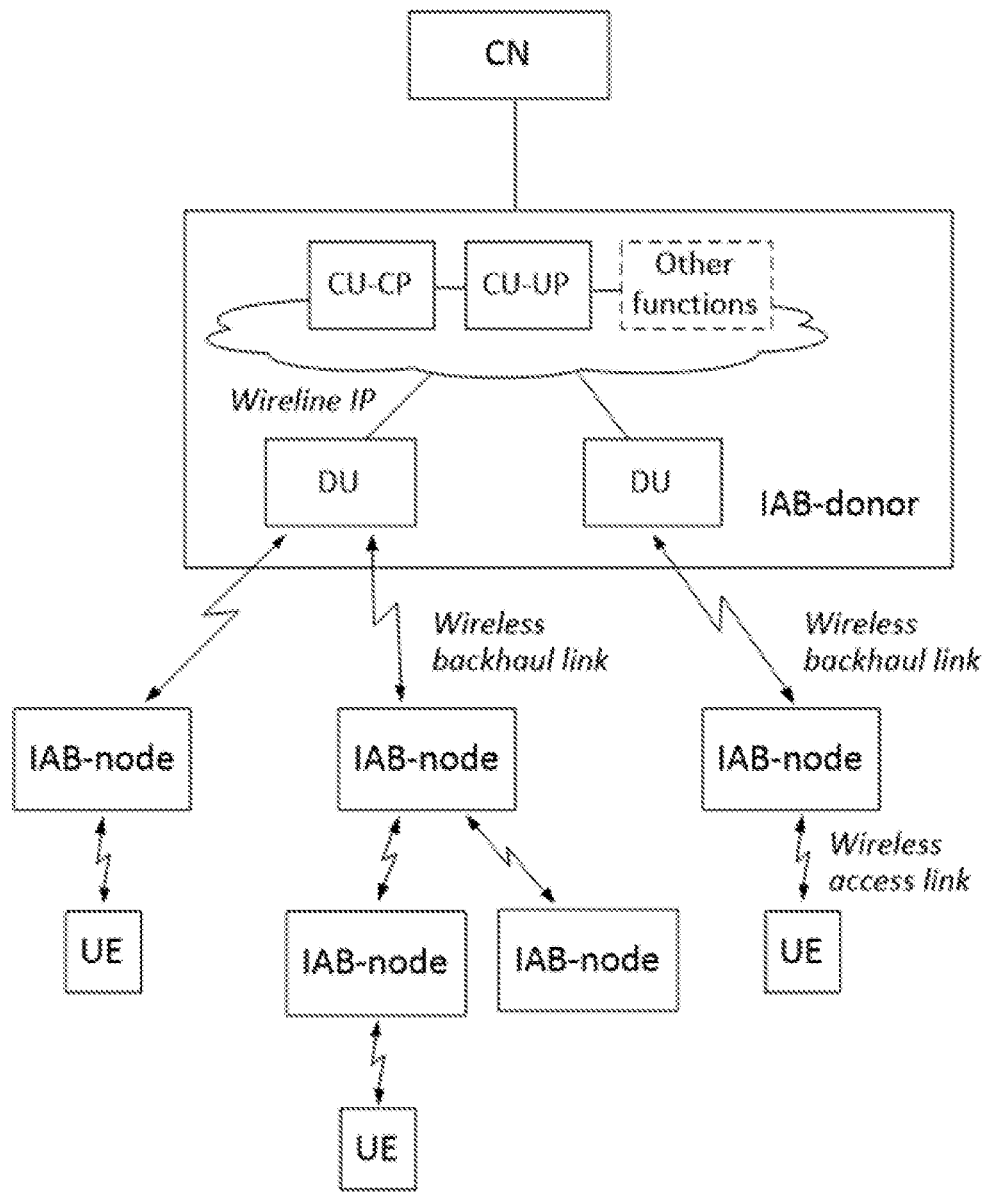
FIG. 2A is a reference diagram for IAB-architectures taken from TR 38.874 [1]
Figure 2B:
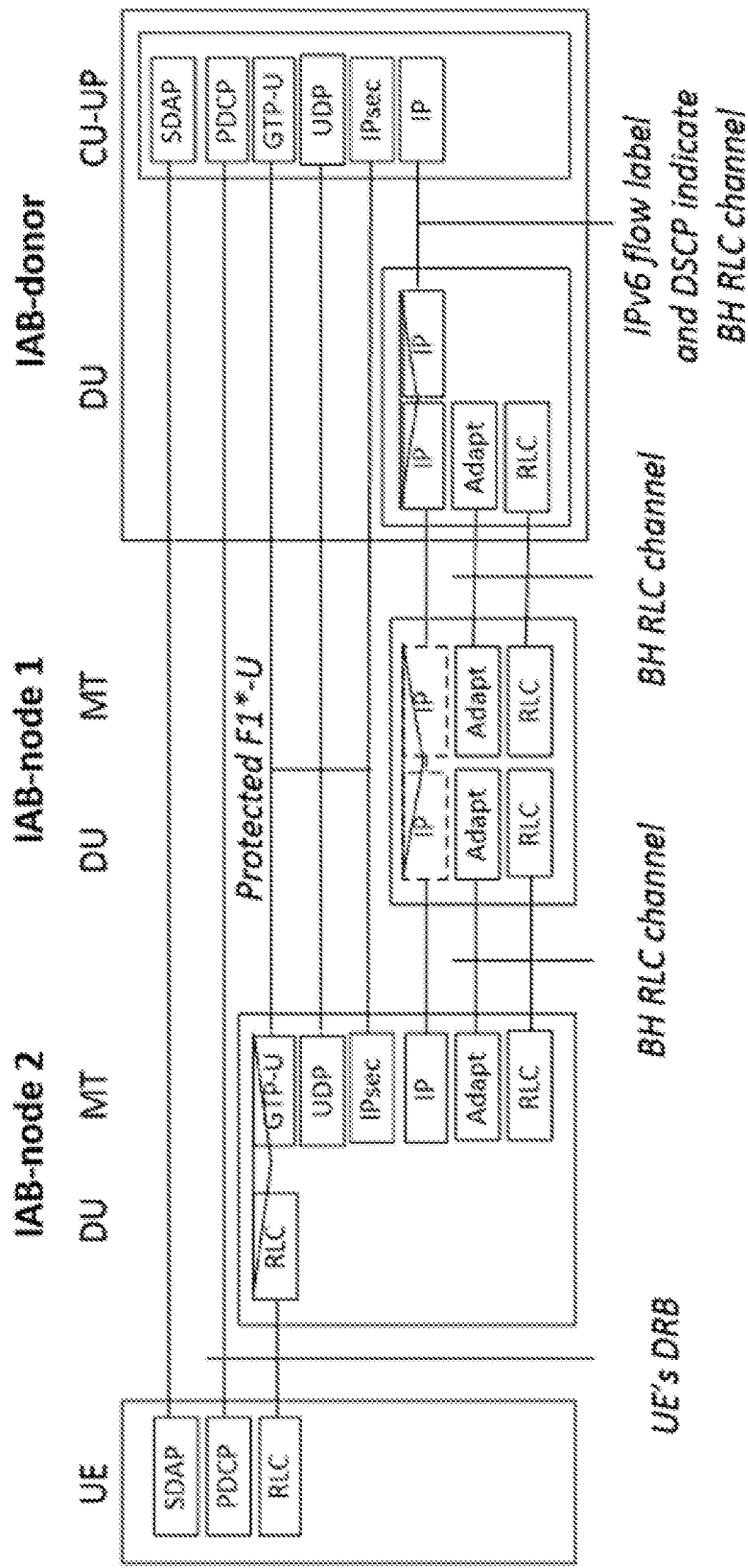
FIG. 2B is an illustration of a Baseline User Plane (UP) Protocol stack for IAB in Rel-16.
Figure 2C:
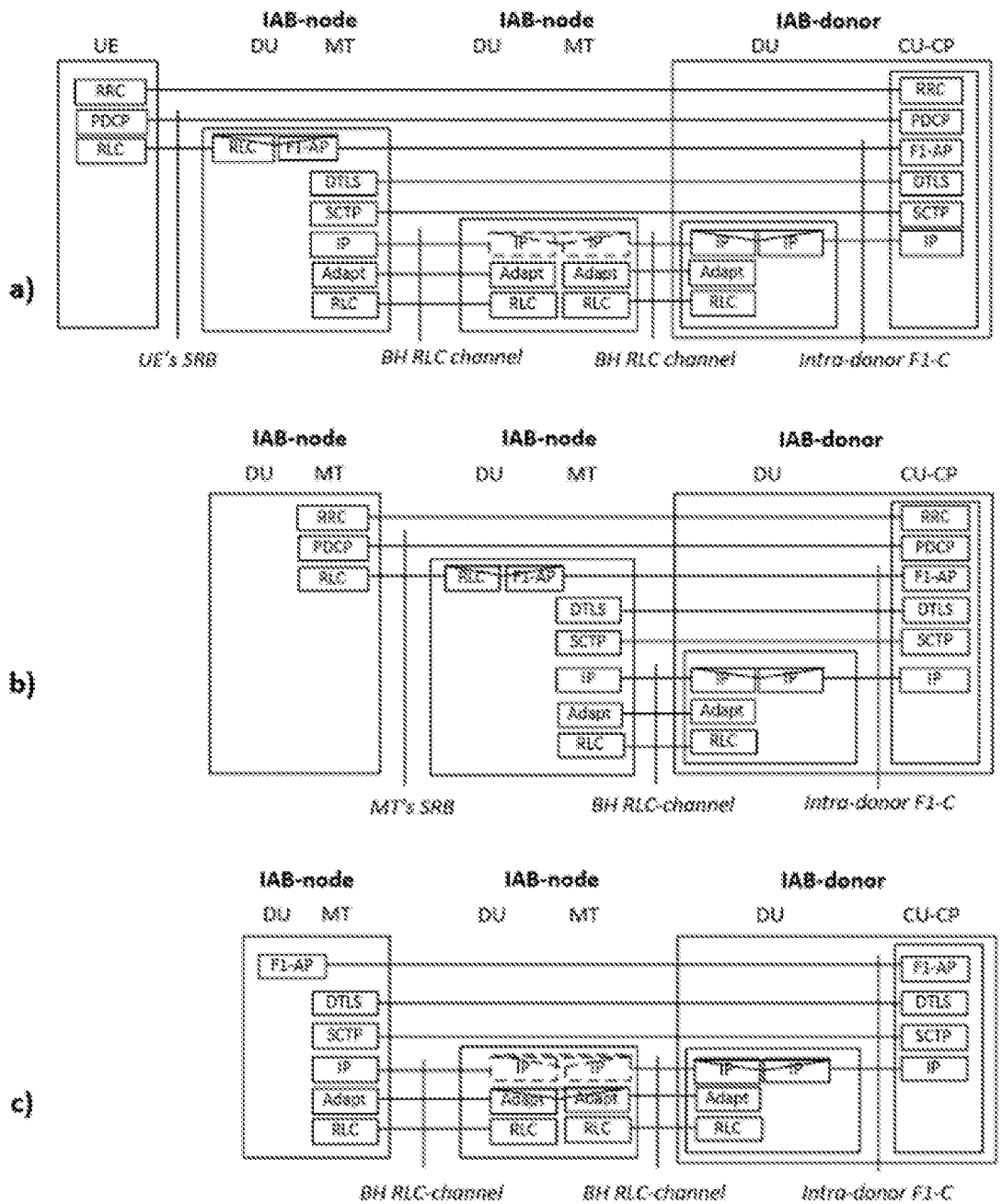
FIG. 2C is an illustration of a Baseline Control Plane (CP) Protocol stack for IAB in Rel-16.
Figure 3A:
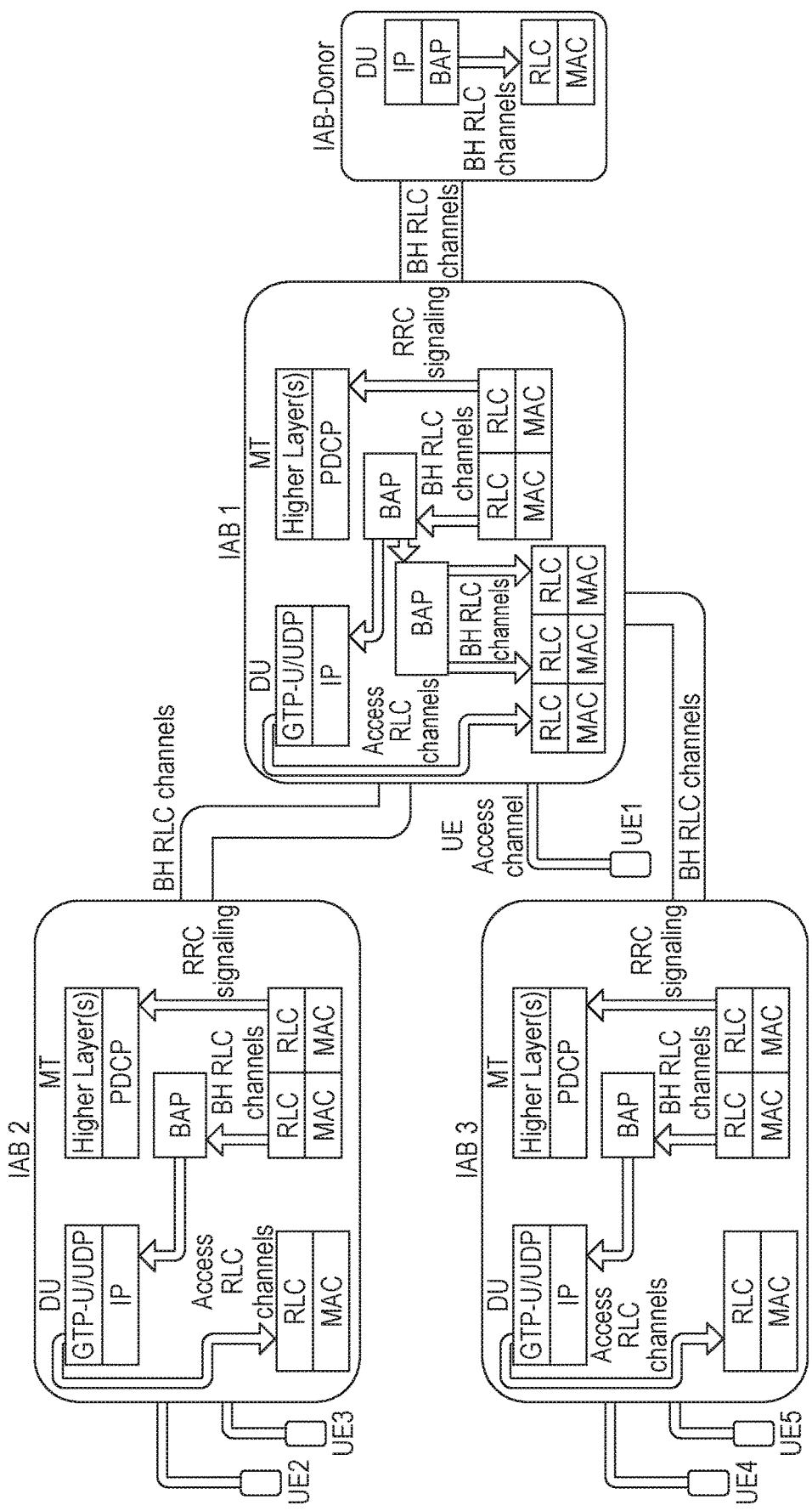
FIG. 3A is a flowchart of an example of bearer mapping in IAB nodes for downstream transmission.
Figure 3B:
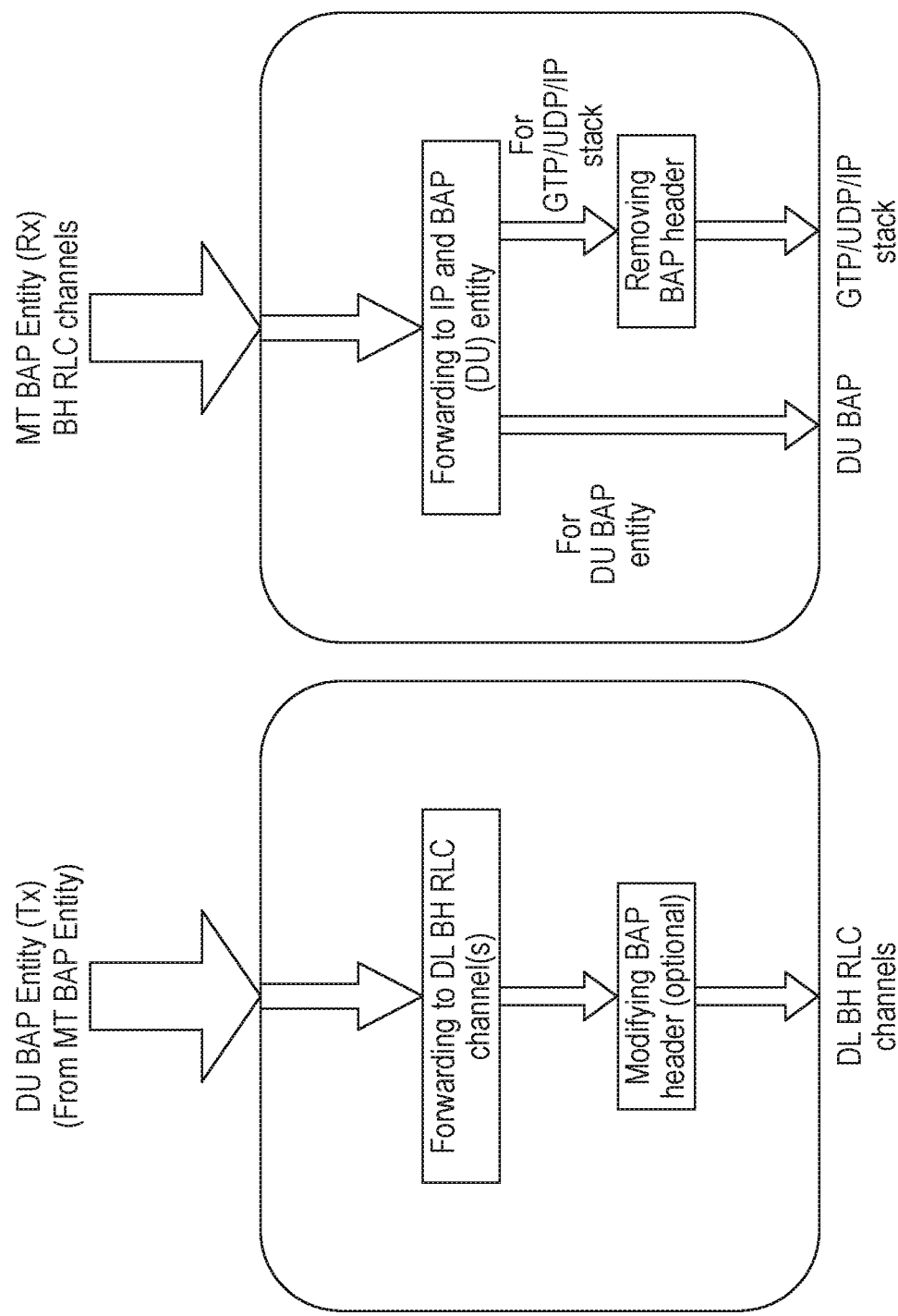
FIG. 3B is a flowchart of an example of the functions performed by BAP entities for downstream transmission.
Figure 4A:
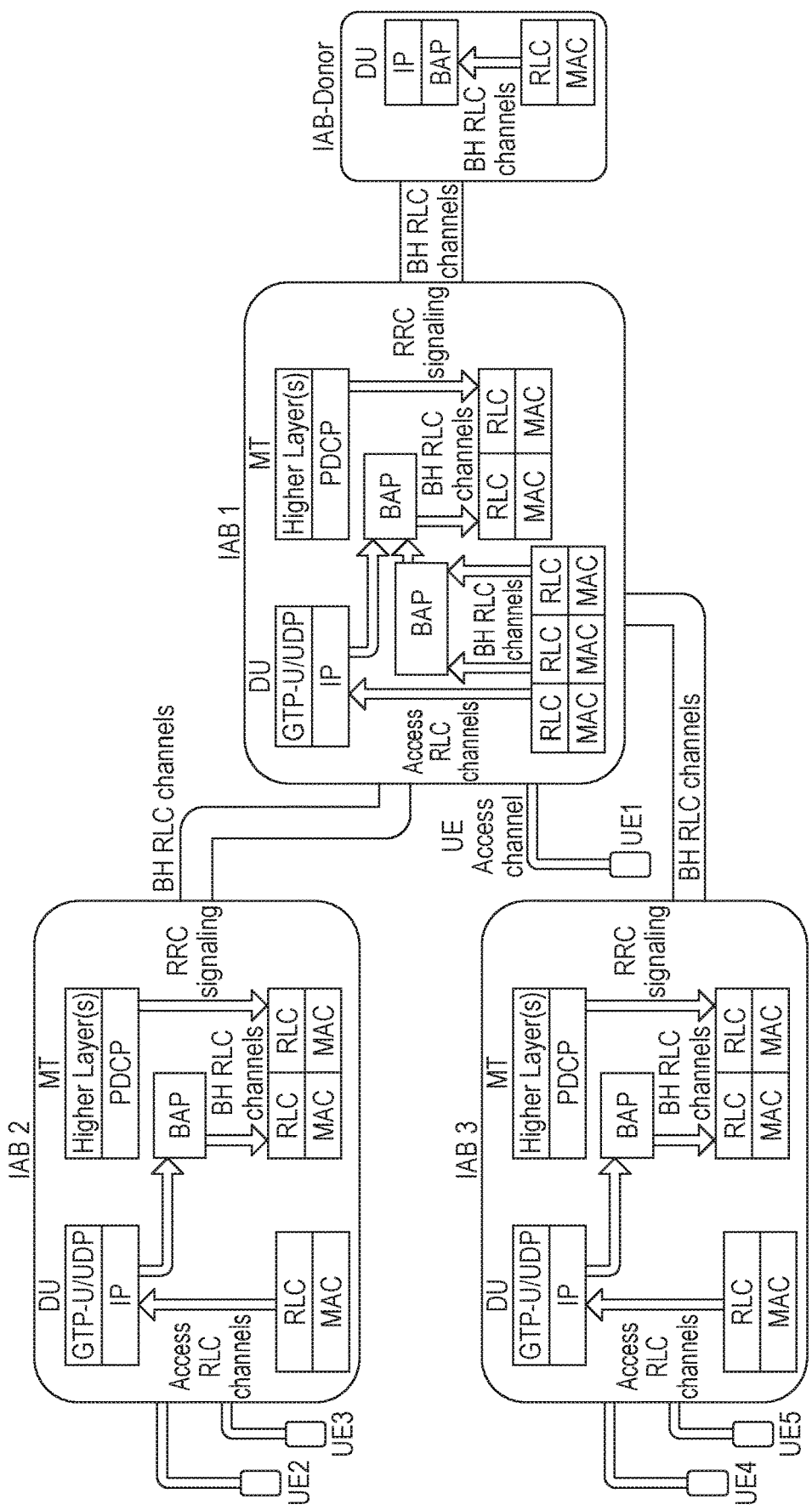
FIG. 4A is a flow chart of an example of bearer mapping in IAB nodes for upstream transmission.
Figure 4B:
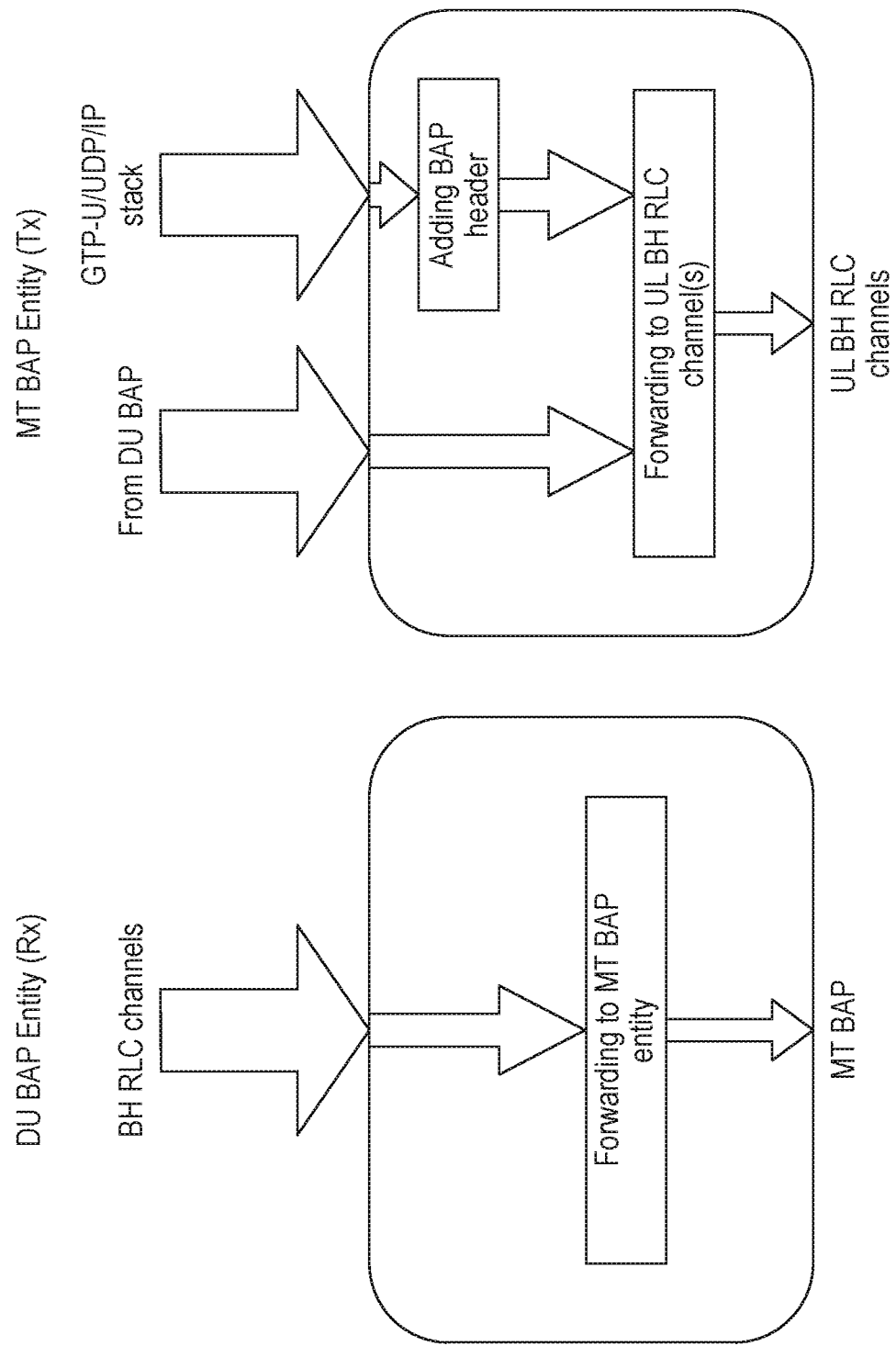
FIG. 4B is a flow chart of an example of the functions performed by BAP entities for upstream transmission.

The wireless network may provide communication and other types of services to one or more wireless devices to facilitate the wireless devices' access to and/or use of the services provided by, or via, the wireless network. The network nodes 760 and 760*b* may comprise gNBsa comprising a CU-CP and a CU-UP as described above. In particular, the network nodes may be connected to IAB nodes in a chain as illustrated in FIG. 1.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (Wi Max), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein.

Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770. Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein.

For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
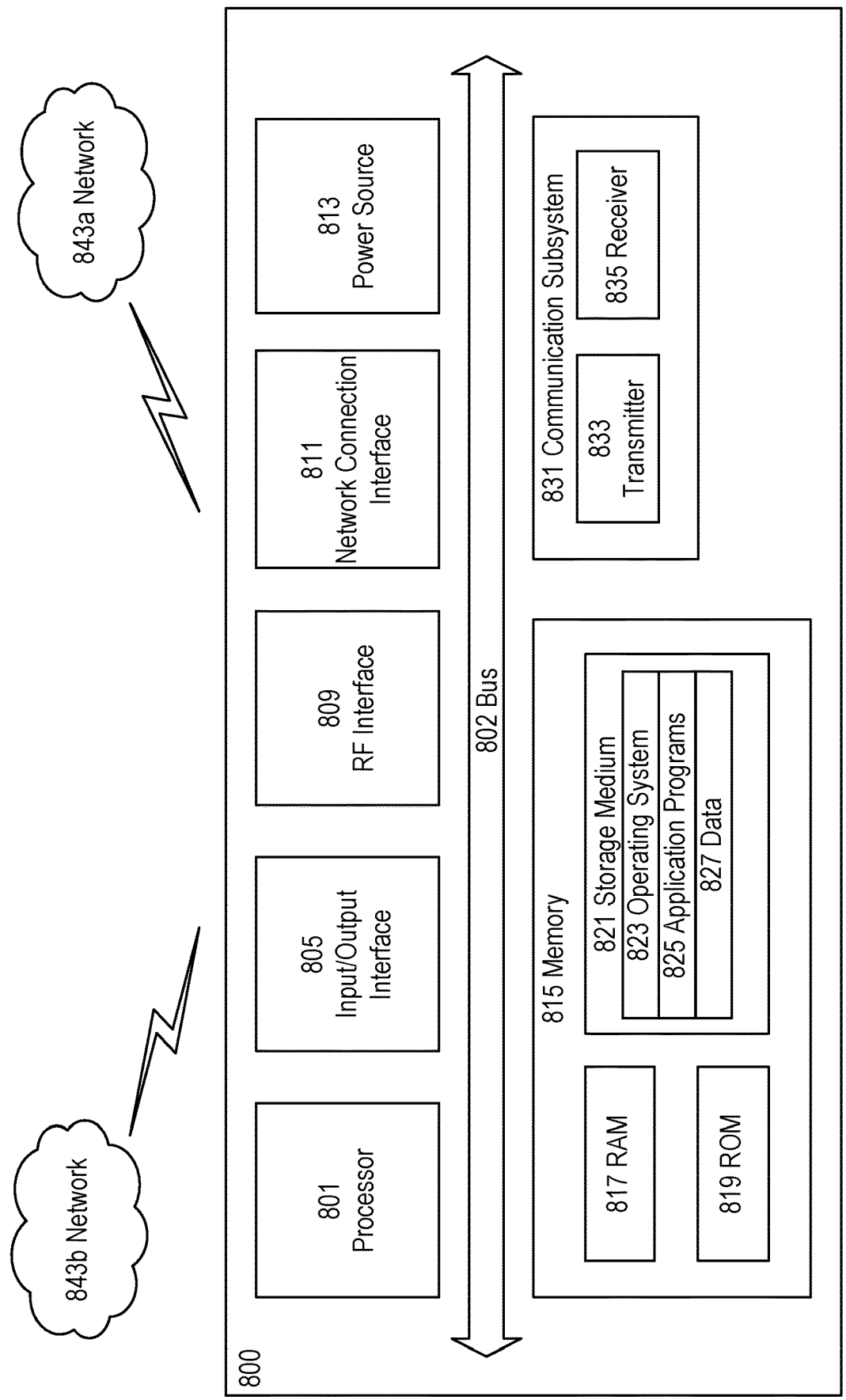
FIG. 8 is a schematic diagram of a user equipment in accordance with some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 800 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
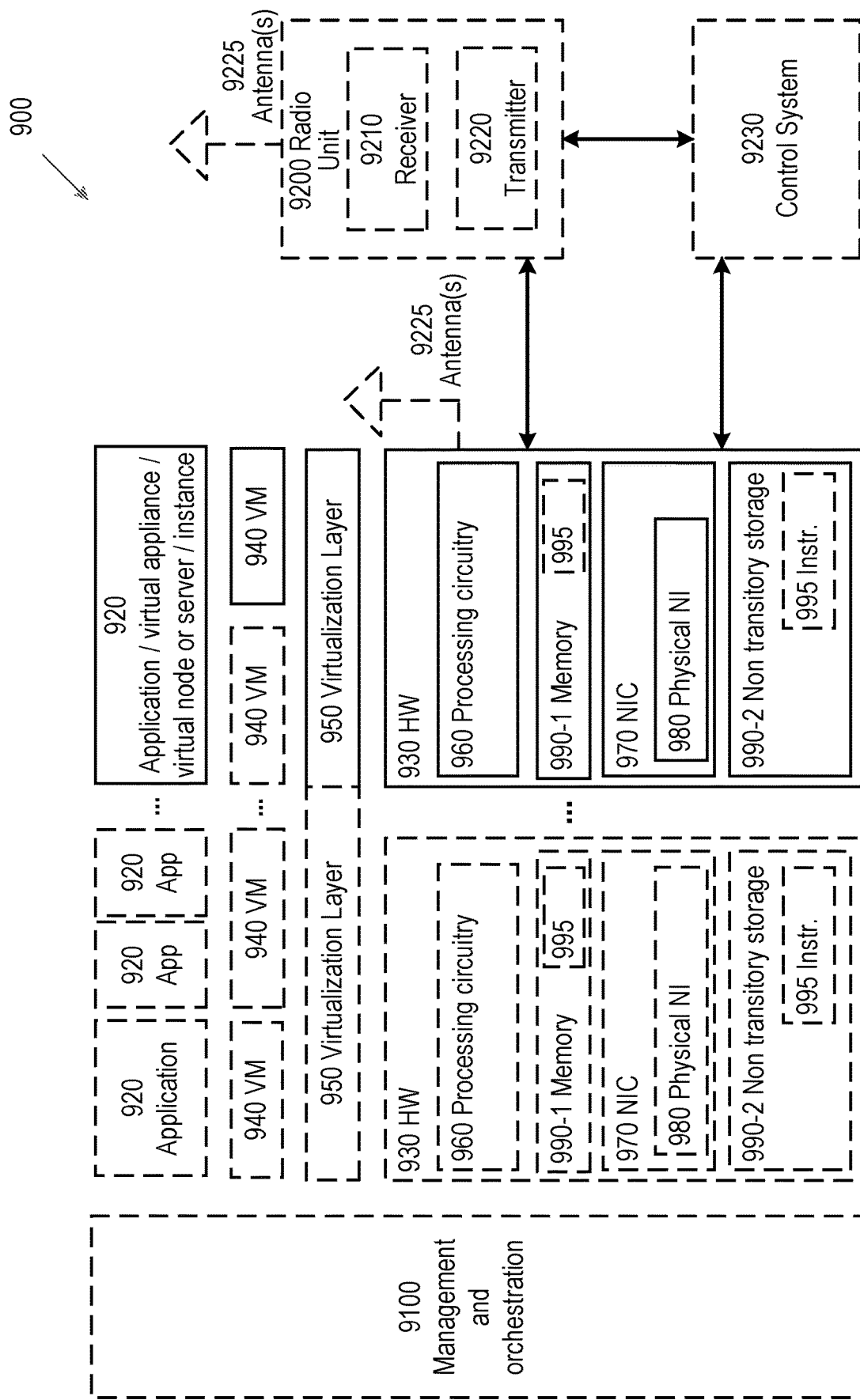
FIG. 9 is a schematic diagram of a virtualization environment in accordance with some embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
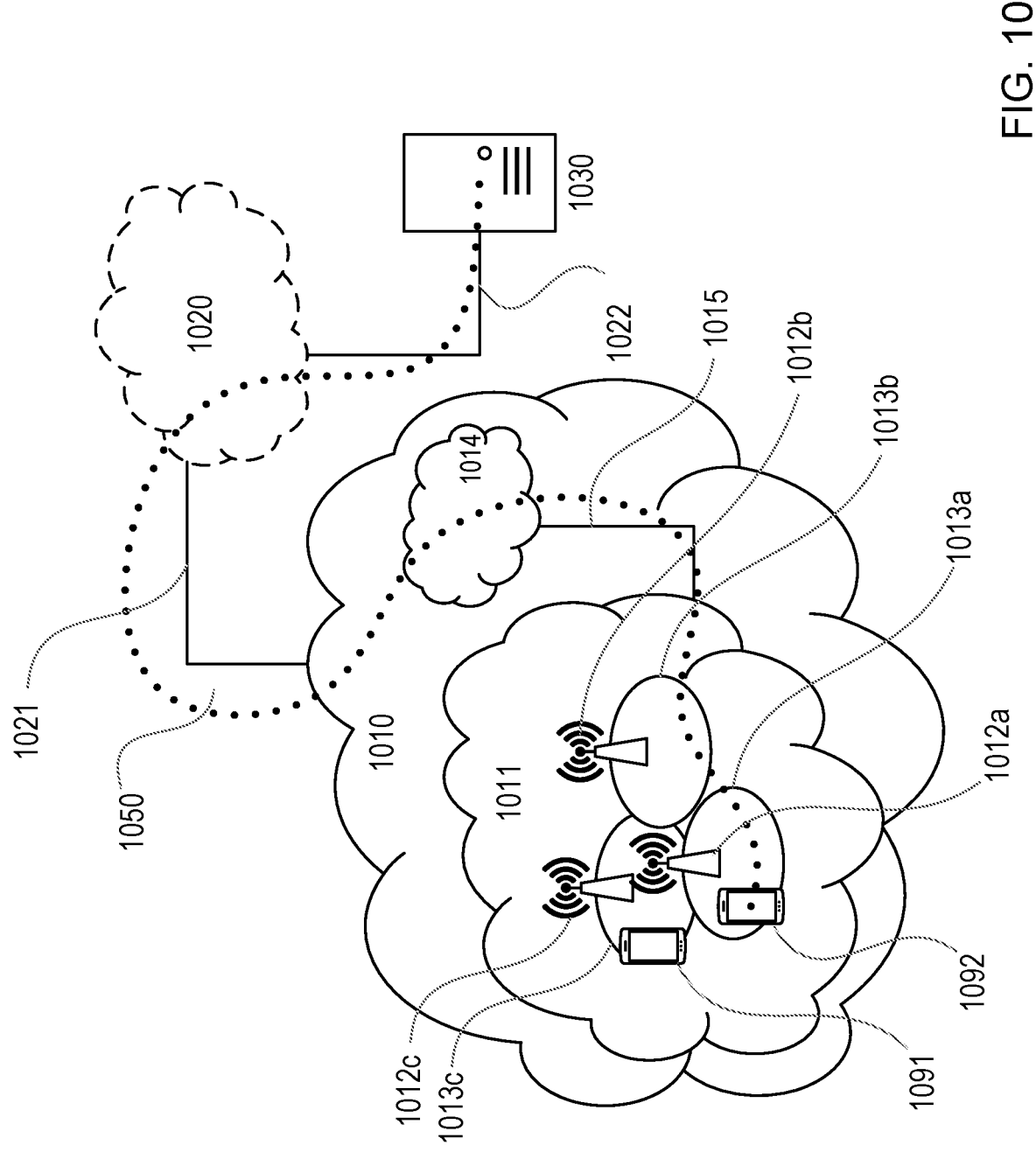
FIG. 10 is a schematic diagram of a telecommunication network connected via an intermediate network to a host computer in accordance with some embodiments.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11)

served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
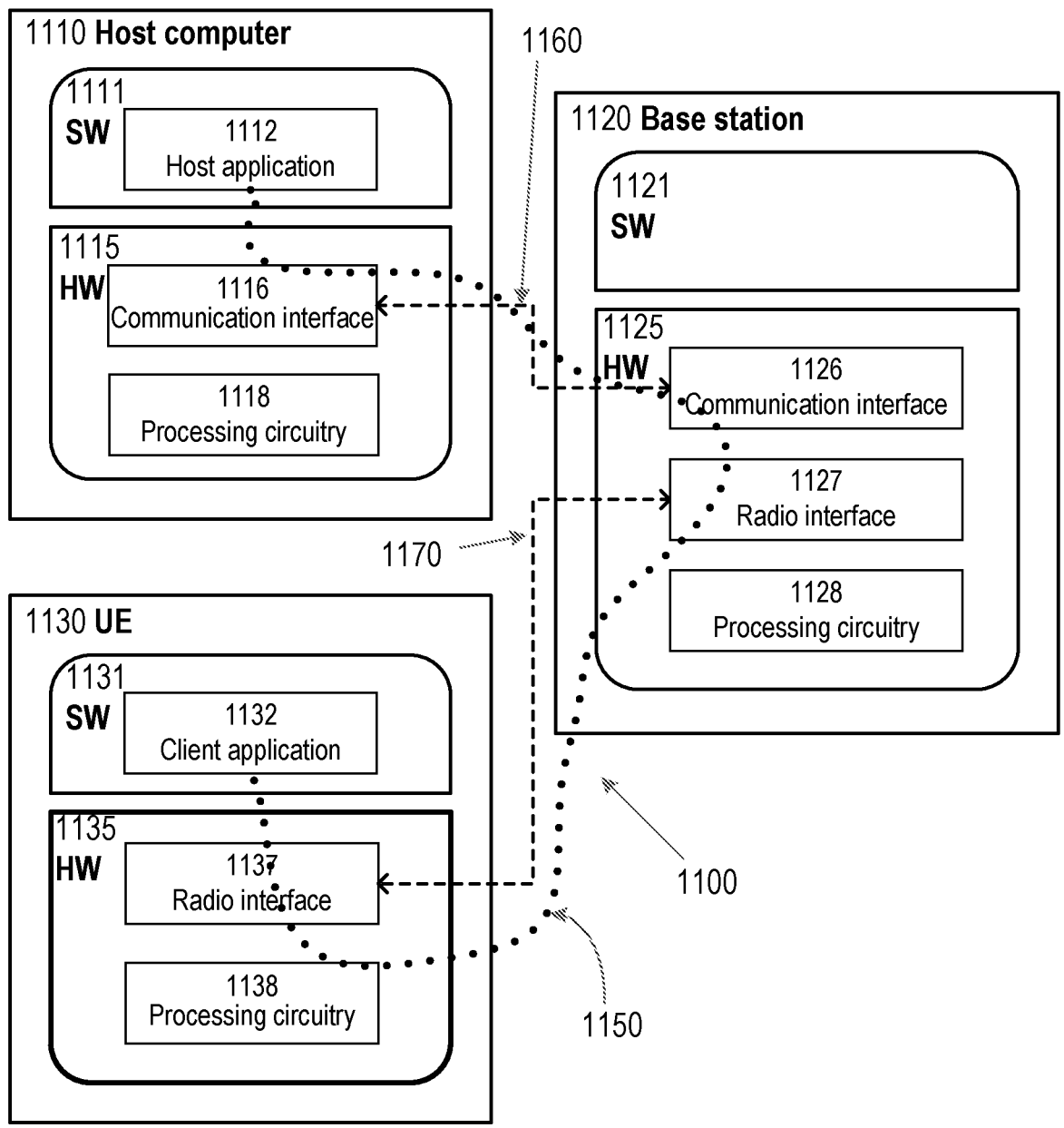
FIG. 11 is a schematic diagram of a host computer communicating via a base station with a user equipment over a partially wireless connection in accordance with some embodiments.

It is noted that host computer 1110, base station 1120 and UE 1130 illustrated in FIG. 11 may be similar or identical to host computer 1030, one of base stations 1012*a*, 1012*b*, 1012*c* and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
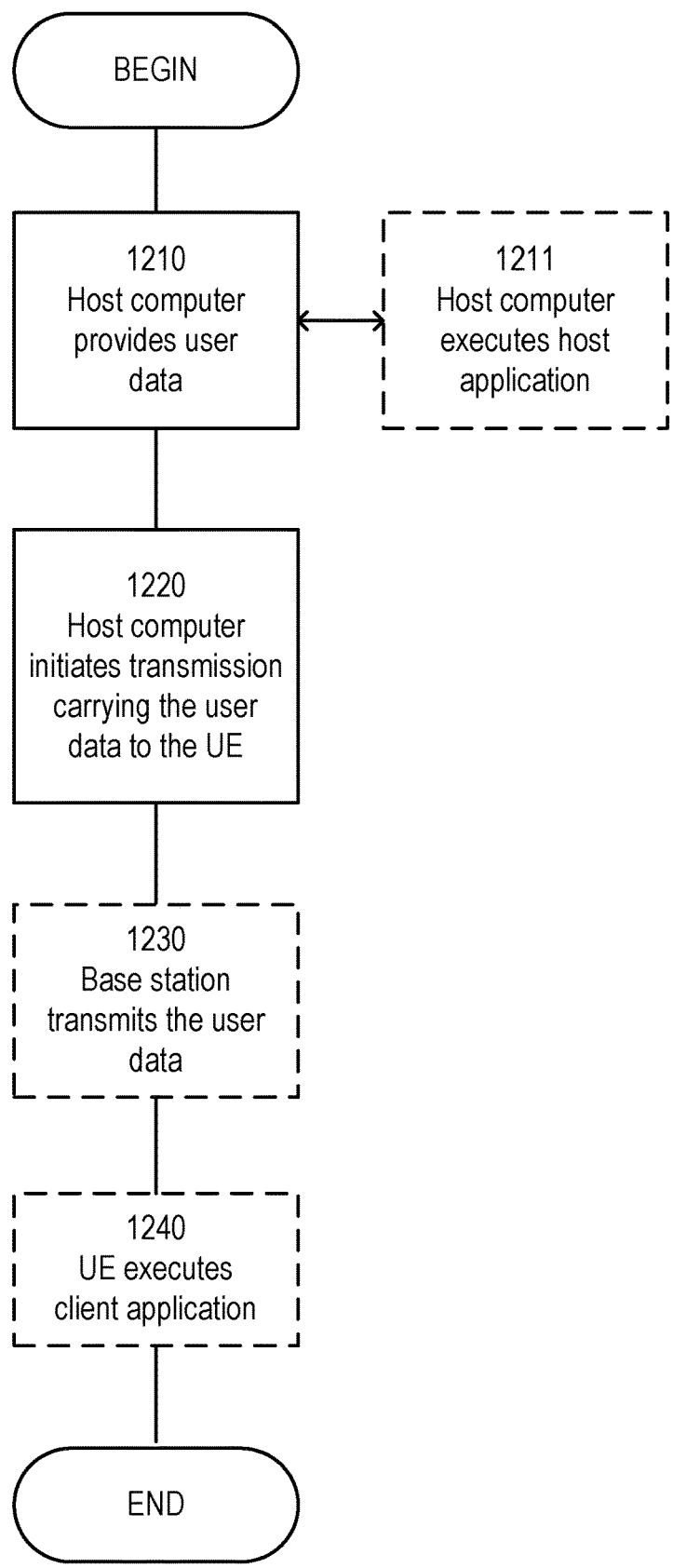
FIG. 12 is a flowchart showing methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
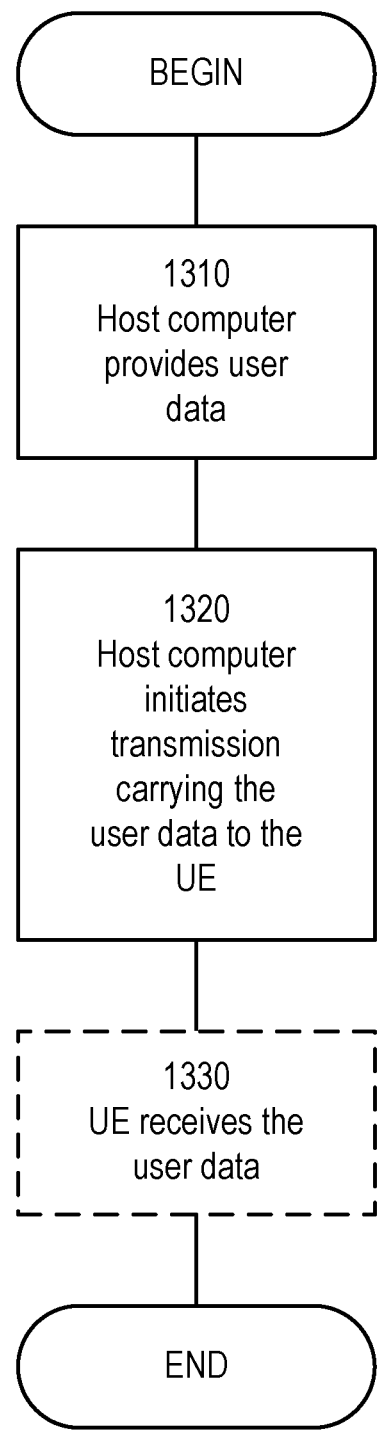
FIG. 13 is a flowchart showing methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
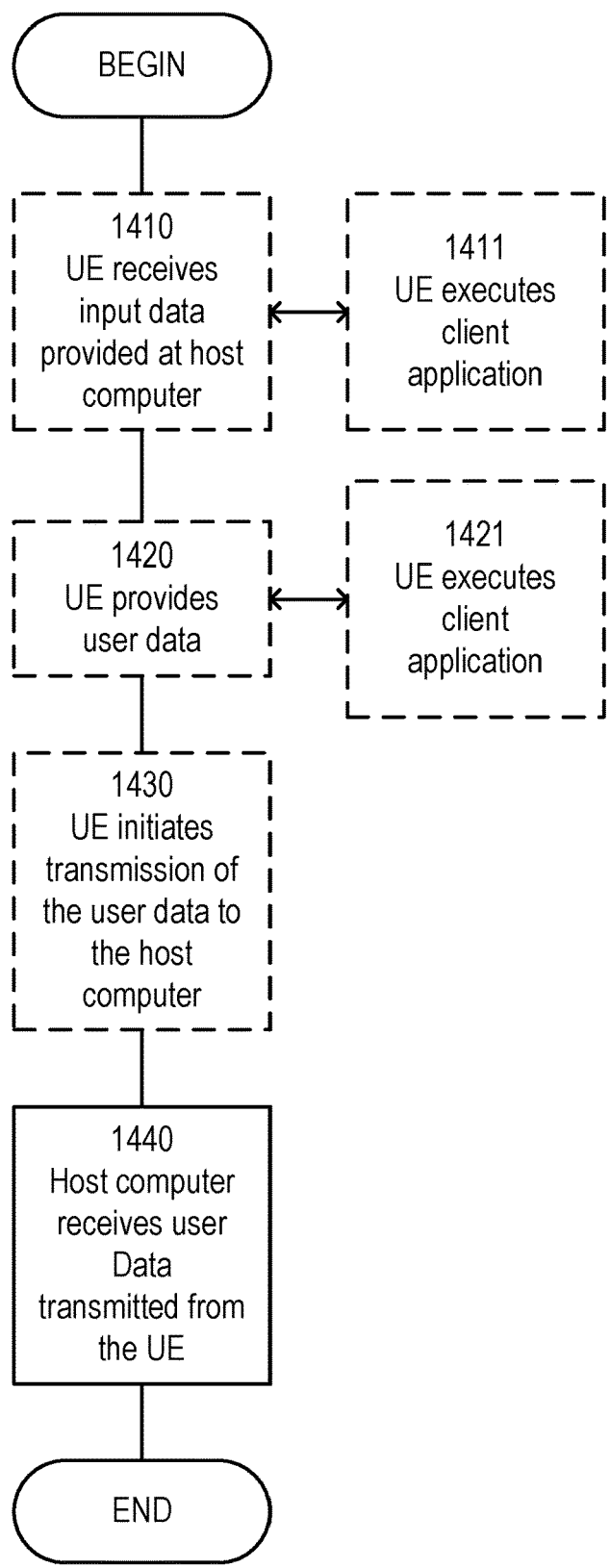
FIG. 14 is a flowchart showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
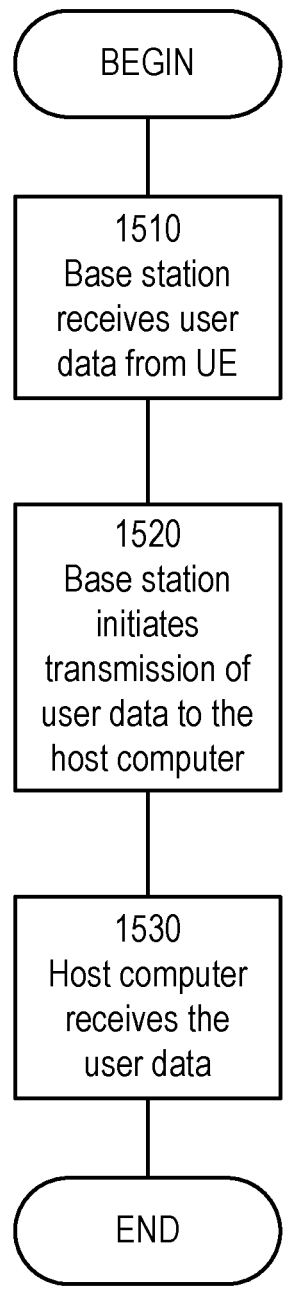
FIG. 15 is a flowchart showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 16A:
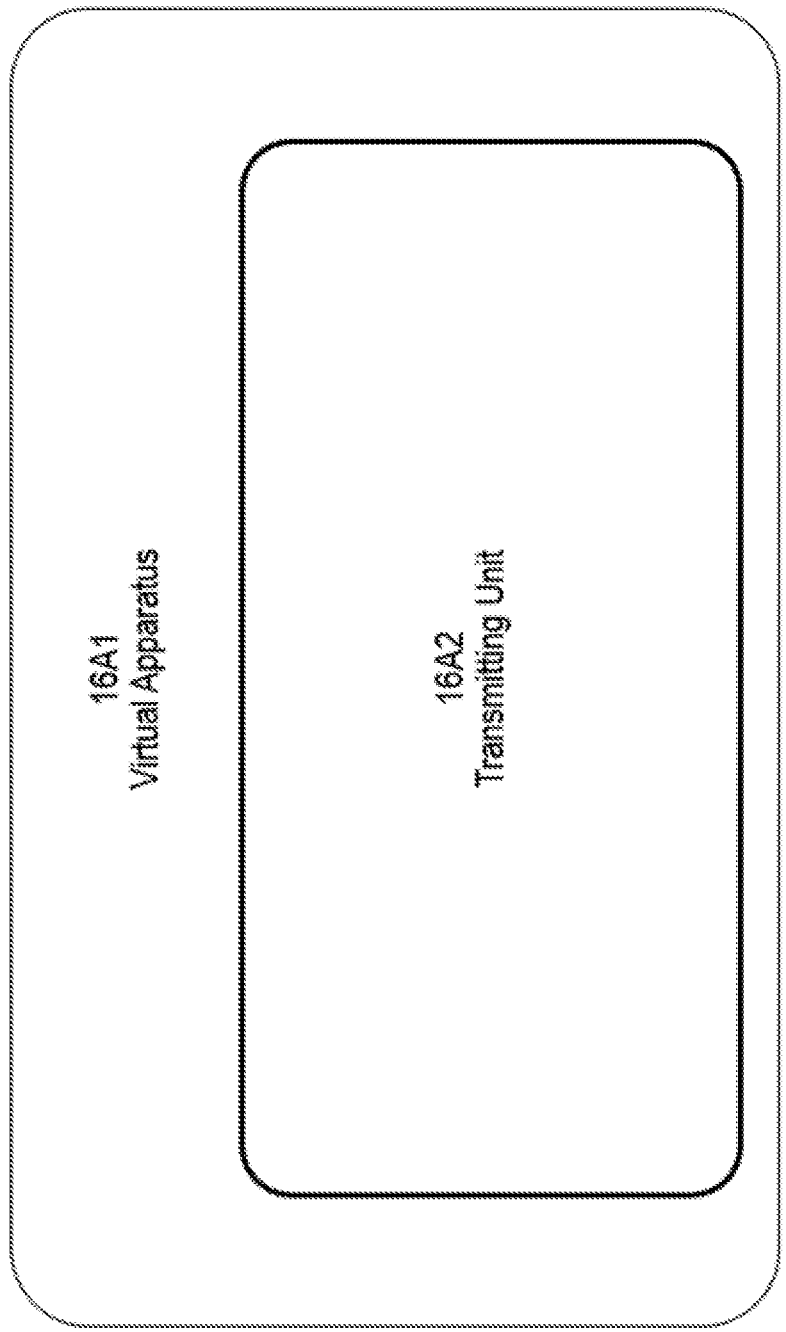
FIG. 16A is a schematic diagram of a virtualization apparatus in accordance with some embodiments.

FIG. 16A illustrates a schematic block diagram of an apparatus 16A in a wireless network (for example, the wireless network shown in FIG. 7). The apparatus may be implemented in a network node (e.g., network node 760 shown in FIG. 7). In particular the apparatus 16A1 may comprise a CU-CP of a network node 760. Apparatus 16A1 is operable to carry out the example method described with reference to FIG. 6A and possibly any other processes or methods disclosed herein. It is also to be understood that the method of FIG. 6A is not necessarily carried out solely by apparatus 16A1. At least some operations of the method can be performed by one or more other entities.

Virtual Apparatus 16A1 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the transmitting unit 16A2 and any other suitable units of apparatus 16A1 to perform corresponding functions according one or more embodiments of the present disclosure.

As illustrated in FIG. 16A, apparatus 16A1 includes transmitting unit 16A2 which is configured to transmit a first message to setup or modify a first bearer context for a first bearer in a central unit user plane, CU-UP, of the base station, wherein the first message comprises an information element indicating mapping information for use in determining a mapping of the first bearer to a backhaul radio link control, BH RLC, channel.

Figure 16B:
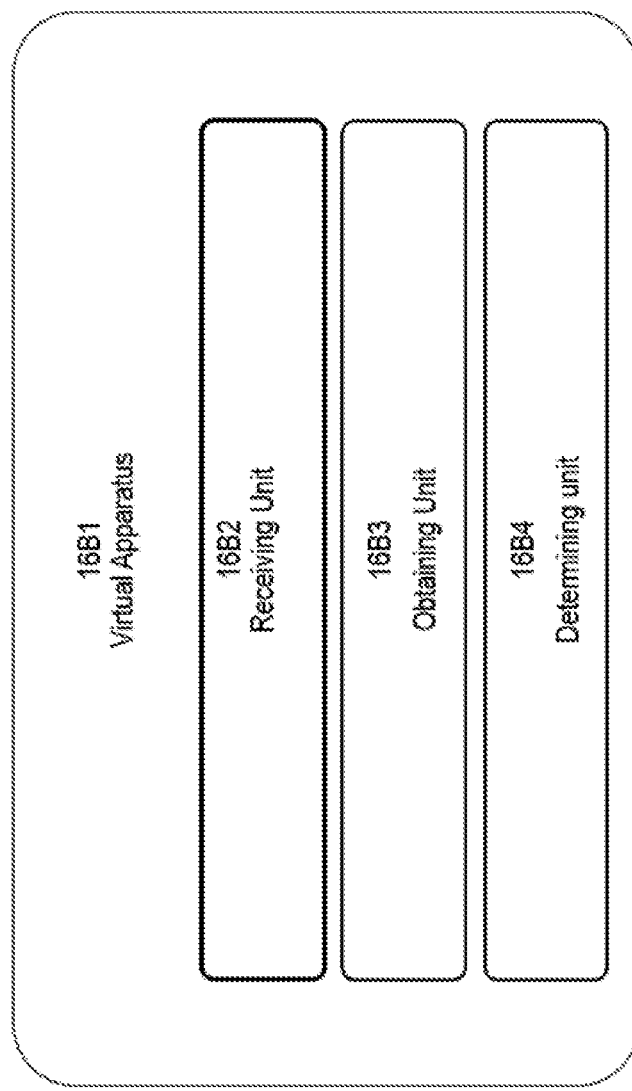
FIG. 16B is a schematic diagram of a virtualization apparatus in accordance with some embodiments.

FIG. 16B illustrates a schematic block diagram of an apparatus 16B1 in a wireless network (for example, the wireless network shown in FIG. 7). The apparatus may be implemented in a network node (e.g., network node 760 shown in FIG. 7). In particular the apparatus 16B1 may comprise a CU-UP of a network node 760. Apparatus 16B1 is operable to carry out the example method described with reference to FIG. 6B and possibly any other processes or methods disclosed herein. It is also to be understood that the method of FIG. 6B is not necessarily carried out solely by apparatus 16B1. At least some operations of the method can be performed by one or more other entities.

Virtual Apparatus 16B1 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the receiving unit 16B2, obtaining unit 16B3 and determining unit 16B4, and any other suitable units of apparatus 16B1 to perform corresponding functions according one or more embodiments of the present disclosure.

As illustrated in FIG. 16B, apparatus 16B1 includes receiving unit 16B2 which is configured to receive a first message from a central unit control plane, CU-CP, of the base station to setup or modify a first bearer context for a first bearer in a central unit user plane, CU-UP, of the base station. Apparatus 16B1 also comprises obtaining unit 16B3 which is configured to obtain mapping information for use in determining a mapping of the first bearer to a backhaul radio link control, BH RLC, channel. Apparatus 16B1 also comprises determining unit 16B4 which is configured to based on the mapping information, determine a field value for the first bearer wherein the field value maps the first bearer to the BH RLC.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

CN Core Network
CU Centralized Unit
CU-CP CU Control Plane
CU-UP CU User Plane
DFTS-OFDM Discrete Fourier Transform (DFT) Spread OFDM
DL Downlink
DU Distributed Unit
eNB evolved Node B (a base station supporting the LTE air interface for communication with UEs)
EN-DC E-UTRAN-NR Dual Connectivity
EPC Evolved Packet Core
F1 Interface between a gNB-CU and a gNB-DU
F1-AP F1 Application Protocol
F1* modified form of F1 (within the IAB context; details of F1* remain to be specified; protocol translation between F1* and F1 in case the IAB-donor is split is studied)
F1*-U modified form of F1 interface—User Plane
gNB a base station supporting the NR air interface for communication with UEs
GTP-U GPRS Tunneling Protocol—User Plane
IAB Integrated Access and backhaul
IP Internet Protocol
L1 Layer one
L2 Layer 2
L-GW LIPA Gateway (LIPA—Local IP Access)
LTE Long Term Evolution
MAC Medium Access Control
MCS Modulation and Coding Scheme
N4 Interface between SMF (Session Management Function) and UPF (User Plane Function) in the 5GC
NAS Non Access Stratum
NG (logical) Interface between an gNB and 5GC (i.e. NG-RAN and 5G core network)
NGC NG-C; NG Interface Control Plane
NR New Radio
NSA Non-Standalone
OAM Operation and Maintenance
OFDM Orthogonal Frequency-Division Multiplexing
PDCP Packet Data Convergence Protocol
PDN Packet Data Network
PDU Protocol Data Unit
PHY Physical layer
S-GW: Serving Gateway (user plane node connecting EPC and LTE RAN)
P-GW (PDN-GW): Packet Data Network Gateway (connects EPC to internet)
RLC Radio Link Control
RRC Radio Resource Control
Rx Receiver
S1 Interface between an eNB and EPC (i.e. RAN and core network)
S5 Interface between P-GW and S-GW
SDAP Service Data BAP Protocol
SNR Signal-to-Noise Ratio
Tx Transmitter
UDP User Datagram Protocol
UE User Equipment
UL Uplink
UPF User Plane Function
Uu The radio interface from the eNodeB to the UE (also known as the LTE-Uu interface)
X2 Interface between two eNBs
Xn Interface between two gNBs or between an eNB and gNB in non-EN-DC cases
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by central unit control plane (CU-CP) of a base station for providing Integrated Access and Backhaul (IAB) mapping information, wherein the base station is configured as a donor base station for one or more IAB nodes, the method comprising:
   transmitting, to a central unit user plane (CU-UP) of the base station, a first message to setup or modify a first bearer context for a first bearer in the CU-UP, wherein the first message comprises an information element indicating mapping information for use in determining a mapping of the first bearer to a backhaul radio link control (BH RLC) channel, wherein the mapping information comprises an indication of whether the first bearer is served by an IAB node.

2. The method of claim 1, wherein the mapping information comprises a Flow Label value.

3. The method of claim 1, wherein the mapping information comprises a differentiated services code point (DSCP) value.

4. The method of claim 1, wherein the mapping information is associated with the BH RLC channel.

5. The method of claim 1, wherein the mapping information maps the first bearer to the BH RLC one-to-one.

6. The method of claim 1, wherein the method further comprises:
   transmitting a second message to setup or modify a second bearer context for a second bearer in the CU-UP, wherein the second message comprises an information element indicating mapping information for mapping the second bearer to the BH RLC channel.

7. The method of claim 1, wherein the mapping information comprises an indication of whether the first bearer is to be mapped one-to-one to the BH RLC link.

8. The method of claim 1, wherein the first message is an E1 Application Protocol (AP) bearer context setup request, or a bearer context modification request.

9. A method performed by central unit user plane (CU-UP) of a base station for providing Integrated Access and Backhaul (IAB) mapping information, wherein the base station is configured as a donor base station for one or more IAB nodes, the method comprising:
   receiving a first message from a central unit control plane (CU-CP) of the base station to setup or modify a first bearer context for a first bearer in a central unit user plane (CU-UP) of the base station;
   obtaining mapping information for use in determining a mapping of the first bearer to a backhaul radio link control (BH RLC) channel; and
   based on the mapping information, determining a field value for the first bearer wherein the field value maps the first bearer to the BH RLC.

10. The method of claim 9, wherein the step of obtaining comprises obtaining the mapping information from an information element in the first message.

11. The method of claim 10, wherein the mapping information comprises the field value as a Flow Label value.

12. The method of claim 9, wherein the mapping information comprises the field value as a differentiated services code point (DSCP) value.

13. The method of claim 9, wherein the mapping information is associated with the BH RLC channel.

14. The method of claim 9, wherein the method further comprises:
receiving a second message from the CU-CP to setup or modify a second bearer context for a second bearer in the CU-UP, wherein the second message comprises an information element indicating mapping information for mapping the second bearer to the BH RLC channel.

15. The method of claim 9, wherein the mapping information comprises an indication of whether the first bearer is to be mapped one-to-one to the BH RLC link, and wherein the method further comprises:
assigning the field value associated with the BH RLC channel to the first bearer based on the indication.

16. The method of claim 15, wherein the method comprises using a Flow Label value or a DSCP value for the field value, depending on the indication.

17. The method of claim 9, wherein the mapping information indicates whether the first bearer is served by an IAB node.

18. The method of claim 17, wherein the mapping information is obtained by determining whether the IP Address of a F1-U tunnel for the first bearer has been configured as an IAB node IP address.

19. The method of claim 17, further comprising:
responsive to the first bearer being served by an IAB node, determining whether the first bearer meets a criteria for one-to-one mapping;
responsive to the first bearer meeting the criteria, assigning the field value associated with the BH RLC channel to the first bearer with a one-to-one mapping; and
responsive to the first bearer not meeting the criteria, assigning the field value associated with the BH RLC channel to the first bearer with an N-to-one mapping.

20. The method of claim 19, wherein the criteria comprise a quality of service (QOS) criteria.

21. The method of claim 9, further comprising:
transmitting the field value to a transport layer for inclusion in a header of user plane packets for the first bearer.

22. The method of claim 9, wherein the first message is an E1 Application Protocol (AP) bearer context setup request or a bearer context modification request.

23. A method performed by a base station for providing Integrated Access and Backhaul (IAB) mapping information, wherein the base station is configured as a donor base station for one or more IAB nodes, the method comprising:
performing, by a central unit control plane (CU-CP) of the base station, the step of transmitting a first message to setup or modify a first bearer context for a first bearer in a central unit user plane (CU-UP) of the base station, wherein the first message comprises an information element indicating mapping information for use in determining a mapping of the first bearer to a backhaul radio link control (BH RLC) channel;
performing, by the CU-UP of the base station, the steps of:
receiving the first message from the CU-CP of the base station to setup or modify the first bearer context for the first bearer in the CU-UP of the base station;
obtaining mapping information for use in determining the mapping of the first bearer to the BH RLC channel; and
based on the mapping information, determining a field value for the first bearer wherein the field value maps the first bearer to the BH RLC.

24. A base station for providing Integrated Access and Backhaul (IAB) mapping information, the base station being configured as a donor base station for one or more IAB nodes, comprising:
processing circuitry configured to cause a central unit control plane (CU-CP) of the base station to transmit, to a central unit user plane (CU-UP) of the base station, a first message to setup or modify a first bearer context for a first bearer in the CU-UP, wherein the first message comprises an information element indicating mapping information for use in determining a mapping of the first bearer to a backhaul radio link control (BH RLC) channel; and
power supply circuitry configured to supply power to the base station;
wherein the processing circuitry is further configured to cause the CU-UP to:
receive the first message from the central unit control plane (CU-CP) of the base station to setup or modify a first bearer context for a first bearer in the CU-UP of the base station;
obtain mapping information for use in determining a mapping of the first bearer to a backhaul radio link control (BH RLC) channel; and
based on the mapping information, determine a field value for the first bearer wherein the field value maps the first bearer to the BH RLC.

* * * * *